US009131165B2

(12) United States Patent
Takahashi et al.

(10) Patent No.: US 9,131,165 B2
(45) Date of Patent: Sep. 8, 2015

(54) ILLUMINATION LIGHT SOURCE SYSTEM, PROJECTOR HAVING THE SAME, AND METHOD OF CONTROLLING PROJECTOR

(71) Applicants: Tatsuya Takahashi, Shinagawa-ku (JP); Kazuhiro Fujita, Machida (JP); Toshiharu Murai, Kawasaki (JP); Ikuo Maeda, Sagamihara (JP); Takehiro Nishimori, Yokohama (JP)

(72) Inventors: Tatsuya Takahashi, Shinagawa-ku (JP); Kazuhiro Fujita, Machida (JP); Toshiharu Murai, Kawasaki (JP); Ikuo Maeda, Sagamihara (JP); Takehiro Nishimori, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 158 days.

(21) Appl. No.: 14/024,991

(22) Filed: Sep. 12, 2013

(65) Prior Publication Data

US 2014/0071408 A1    Mar. 13, 2014

(30) Foreign Application Priority Data

Sep. 12, 2012   (JP) .................................. 2012-200135

(51) Int. Cl.
    *G03B 21/14*    (2006.01)
    *H04N 9/31*    (2006.01)
    *F21V 13/08*    (2006.01)
    (Continued)

(52) U.S. Cl.
CPC .............. *H04N 9/3111* (2013.01); *F21V 13/08* (2013.01); *G02B 26/008* (2013.01); *G02B 27/141* (2013.01); *G03B 21/204* (2013.01); *G03B 21/2053* (2013.01); *G03B 33/08* (2013.01); *H04N 9/3114* (2013.01);
(Continued)

(58) Field of Classification Search
USPC ............ 353/31, 34, 37, 84, 85; 348/742, 743, 348/771; 349/5, 7, 8, 9; 362/84, 231
See application file for complete search history.

(56) References Cited

U.S. PATENT DOCUMENTS

2010/0283977 A1* 11/2010 Wang et al. ..................... 353/84
2010/0328625 A1   12/2010 Miyazaki et al.
(Continued)

FOREIGN PATENT DOCUMENTS

JP    10-18623    1/1998
JP    2010-85745    4/2010
(Continued)

OTHER PUBLICATIONS

U.S. Appl. No. 14/014,976, filed Aug. 30, 2013, Takahashi, et al.

*Primary Examiner* — William C Dowling
(74) *Attorney, Agent, or Firm* — Oblon, McClelland, Maier & Neustadt, L.L.P.

(57) ABSTRACT

An illumination light source system includes an excitation light source; a reflection/transmission member having a transmission area which transmits excitation light from the excitation light source and a reflection area which reflects the excitation light, the transmission area and the reflection area sequentially crossing an emission light path of the excitation light source; a fluorescent member provided in at least one of a reflection light path of the excitation light reflected by the reflection area and a transmission light path of the excitation light transmitted through the transmission area, the fluorescent member being provided with a phosphor which generates a color different from that of the excitation light by excitation with the excitation light; and a controller which reduces a light volume of the excitation light source while a boundary area between the transmission area and the reflection area of the reflection/transmission member is located on the emission light path.

22 Claims, 23 Drawing Sheets

(51) Int. Cl.
*G02B 26/00* (2006.01)
*G02B 27/14* (2006.01)
*G03B 21/20* (2006.01)
*G03B 33/08* (2006.01)

(52) U.S. Cl.
CPC .......... *H04N 9/3117* (2013.01); *H04N 9/3155* (2013.01); *H04N 9/3161* (2013.01)

(56) References Cited

U.S. PATENT DOCUMENTS

| | | |
|---|---|---|
| 2013/0010264 A1 | 1/2013 | Takahashi et al. |
| 2013/0021582 A1 | 1/2013 | Fujita et al. |
| 2013/0021587 A1 | 1/2013 | Miyazaki et al. |
| 2013/0114049 A1* | 5/2013 | Li et al. .......................... 353/84 |
| 2014/0071182 A1* | 3/2014 | Takahashi et al. ............ 345/690 |
| 2014/0071407 A1* | 3/2014 | Takahashi et al. ............ 353/31 |
| 2014/0268069 A1* | 9/2014 | Takahashi et al. ............ 353/31 |
| 2014/0340649 A1* | 11/2014 | Takahashi et al. ............ 353/31 |
| 2015/0036332 A1* | 2/2015 | Wang et al. .................... 362/231 |
| 2015/0042963 A1* | 2/2015 | Nishimori et al. ............ 353/57 |

FOREIGN PATENT DOCUMENTS

| | | |
|---|---|---|
| JP | 2011-013316 | 1/2011 |
| JP | 2011-100163 | 5/2011 |

* cited by examiner

ILLUMINATION LIGHT SOURCE SYSTEM, PROJECTOR HAVING THE SAME, AND METHOD OF CONTROLLING PROJECTOR

PRIORITY CLAIM

The present application is based on and claims priority from Japanese Patent Application No. 2012-200135, filed on Sep. 12, 2012, the disclosure of which is hereby incorporated by reference in its entirety.

BACKGROUND

1. Field of the Invention

The present invention relates to an improvement in an illumination light source system, a projector having the illumination light source system, and a method of controlling a projector.

2. Description of the Related Art

An illumination light source system using a high brightness discharge lamp (for example, extra-high pressure mercury lamp) as a light source is known as an illumination light source system for a projector which projects image information of a personal computer (hereinafter, referred to as PC), or the like in a meeting, for example.

The discharge lamp requires a predetermined time to achieve stable emission after the start of lighting although high brightness can be achieved at low costs.

Consequently, solid-state light-emitting elements such as red (R), green (G), blue (B) light-emitting diodes or organic EL elements are practically used as a substitute light source for a discharge lamp.

The use of the solid-state light-emitting elements as an illumination light source of a projector enables high-speed startup of a projector and an environmentally friendly projector.

A technique which obtains a color projection image by using a blue laser diode as a first light source (excitation light source) is known as an illumination light source using solid-state light-emitting elements (refer to Patent Document 1: JP 2011-13316A and Patent Document 2: JP 2010-85745A). With this technique, laser light as excitation light emitted from the blue laser diode irradiates a phosphor, RGB color light is generated by the excitation of the phosphor, and a color projection image is obtained by controlling the tones of RGB color light on a pixel-to-pixel basis by using a light modulation element such as DMD (Digital Micromirror Device).

The illumination light source system described in Patent Document 1 comprises a light-emitting plate (fluorescent wheel) including a phosphor layer having a plurality of segment areas divided in the rotation direction and generating fluorescent light upon the reception of excitation light, and a transmission area which transmits the excitation light; a first light source which irradiates a phosphor with the excitation light; a second light source which emits light of a wavelength different from that of the fluorescent light emitted from the phosphor and that of the excitation light; a condensing optical system which condenses the light emitted from the light-emitting plate (fluorescent wheel) and the light emitted from the second light source on the same light path; and a light-emitting controller which controls the emission of the first and second light sources.

In order to prevent color mixing in a boundary of adjacent segment areas, the light-emitting controller turns off the first light source so as not to emit light, and turns on the second light source so as to emit light.

The illumination light source system described in Patent Document 2 includes a rotation plate (fluorescent wheel) in which phosphors are arranged at intervals in the circumference direction, an excitation light source which irradiates the phosphors with excitation light, and a light-emitting controller which controls the excitation light source to be turned off when an area between the phosphors is located on the optical axis of the excitation light source.

The invention described in Patent Document 1 prevents color mixing in a boundary because the first light source is turned off in a boundary of adjacent segment areas. However, the phosphors of the fluorescent wheel are directly irradiated with the excitation light, so that an irradiation time to the segment areas per unit time (1 second) is constant regardless of the rotation speed of the fluorescent wheel per unit time (1 second). For this reason, the fluorescent property of the phosphors may be deteriorated if the microscopic areas of the segment areas are continuously irradiated with the excitation light.

Consequently, an illumination light source in which a reflection/transmission member having a transmission area and a reflection area is provided in an emission light path of a first light source which emits excitation light and a fluorescent wheel is provided in at least one of a transmission light path formed by the transmission area and a reflection light path formed by the reflection area is developed. In this illumination light source, the emission light path of the excitation light is switched between the transmission light path and the reflection light path in a unit time, so that an irradiation time to the phosphor per unit time can be changed by switching the transmission light path and the reflection light path during the rotation of the fluorescent wheel per unit time (1 second), so as to prevent a deterioration in a fluorescent property of a phosphor.

However, even with the illumination light source in which the reflection/transmission member is provided in the emission light path of the first light source which emits the excitation light, color mixing occurs due to the irradiation of the excitation light when excitation light passes through the boundary area between the reflection area and the transmission area.

In order to prevent such occurrence of the color mixing, it is considered to turn off the excitation light source when the boundary area between the reflection area and the transmission area crosses the emission light path of the excitation light source. However, a brightness of an image is lowered when the excitation light source is turned off.

SUMMARY

The present invention has been made in view of the above circumstances, and an object of the present invention is to provide an illumination light source system which can improve a brightness of an image as well as to prevent occurrence of color mixing while avoiding a deterioration in a phosphor, a projector including the illumination light source system, and a method of controlling the projector.

To attain the above object, one embodiment of the present invention provides an illumination light source system including: an excitation light source; a reflection/transmission member having a transmission area which transmits excitation light from the excitation light source and a reflection area which reflects the excitation light, the transmission area and the reflection area sequentially crossing an emission light path of the excitation light source; a fluorescent member provided in at least one of a reflection light path of the excitation light reflected by the reflection area and a transmission light path of the excitation light transmitted through the transmission area, the fluorescent member being provided with a phosphor which generates a color different from that of the excitation light by excitation with the excitation light; and a controller which reduces a light volume of the excitation light source while a boundary area between the transmission area and the reflection area of the reflection/transmission member is located on the emission light path.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

FIG. 10A illustrates one boundary area of the reflection/transmission wheel overlapped with one tangential line; and FIG. 10B illustrates the other boundary area of the reflection/transmission wheel overlapped with the other tangential line.

DETAILED DESCRIPTION OF THE PREFERRED EMBODIMENTS

Hereinafter, embodiments of the present invention will be described with reference to the drawings.

Embodiment 1

Figure 1:
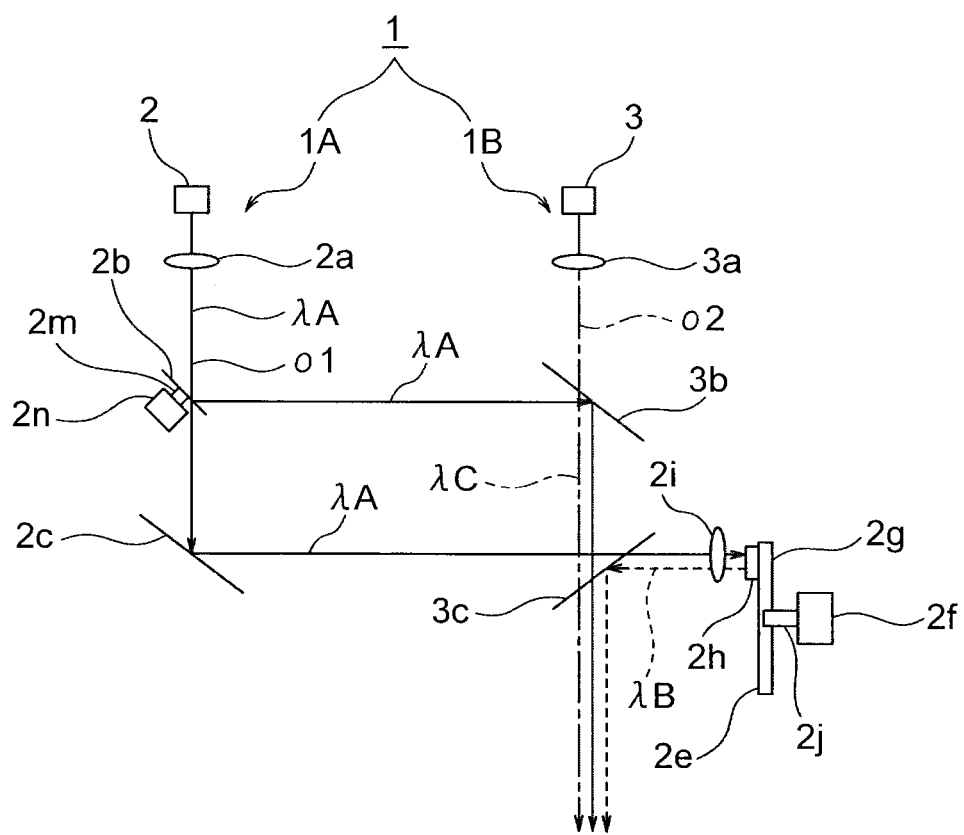
FIG. 1 is an optical view illustrating an illumination light source system according to Embodiment 1 of the present invention.

FIG. 1 is an optical view illustrating one example of an embodiment of an illumination light source system of the present invention. Referring to FIG. 1, reference 1 denotes an illumination optical system in FIG. 1.

(General Configuration of Illumination Optical System 1)

The illumination optical system 1 includes two illumination light sources (hereinafter referred to as a light source) 2, 3. The light source 2 constitutes a part of a first illumination optical system 1A and the light source 3 constitutes a part of a second illumination optical system 1B.

The first illumination optical system 1A includes a coupling lens 2a, reflection/transmission wheel 2b as a reflection/transmission member, total reflection mirror 2c, and fluorescent wheel 2e as a fluorescent member.

The reflection/transmission wheel 2b is provided in the emission light path of the light source 2. The emission light path of the light source 2 is split into a transmission light path and a reflection light path by the after-described transmission and reflection areas of the reflection/transmission wheel 2b.

The second illumination optical system 1B includes a coupling lens 3a, dichroic mirror 3b, and dichroic mirror 3c. The dichroic mirrors 3b, 3c are shared with the first illumination optical system 1A.

The fluorescent wheel 2e is provided in a transmission light path formed by the transmission area of the reflection/transmission wheel 2h, and includes a disc-shaped base 2g and a phosphor 2h. A condensing element 2i is provided in front of the fluorescent wheel 2e.

(Detailed Configuration of First Illumination Optical System 1A)

The light source 2 is a solid-state light-emitting element which emits short-wavelength excitation light. For example, a blue laser diode generating blue laser light as visible light is used for the light source 2. A light-emitting diode which generates blue light can be used instead of the blue laser diode. In this case, the light source 2 emits light of wavelength λA (400 nm<λA<450 nm).

Figure 2:
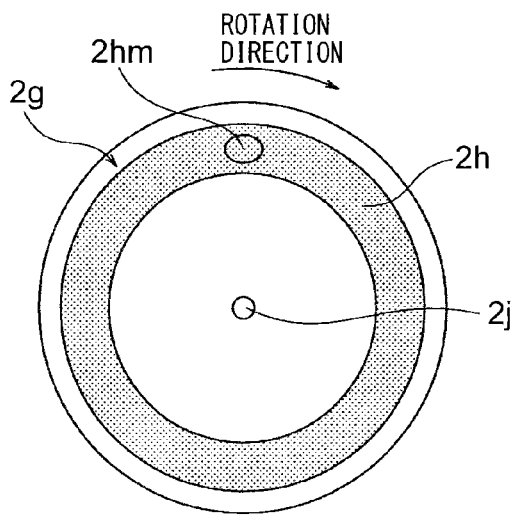
FIG. 2 is a plan view illustrating an enlarged fluorescent wheel illustrated in FIG. 1.
Figure 3:
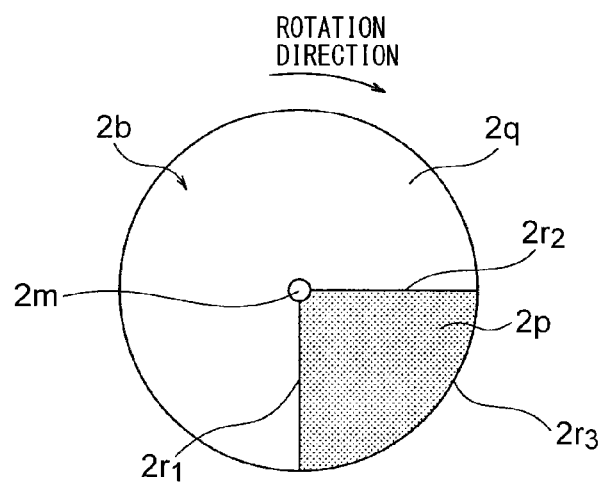
FIG. 3 is a plan view illustrating an enlarged reflection/transmission wheel illustrated in FIG. 1.

FIG. 2 is a view of the disc-shaped base 2g of the fluorescent wheel 2e from a side provided with the phosphor 2h. The disc-shaped base 2g is made of a reflection member. The phosphor 2h has a ring shape. The disc-shaped base 2g rotates about a rotation axis 2j by a driver 2f as a second driver.

The light of wavelength λA passes through the transmission area of the reflection/transmission wheel 2b, then is reflected by the total reflection mirror 2c, and irradiates the fluorescent wheel 2e after being condensed by the condensing element 2i.

In this case, the light of wavelength λA irradiates a micro region 2hm of the phosphor 2h as a spot. If the light of wavelength λA continuously irradiates the same micro area 2hm of the phosphor 2h, the phosphor 2h is burned, resulting in deterioration in property of the phosphor 2h or causing damage.

However, according to the configuration of Embodiment 1, the disc-shaped base 2g always rotates about the rotation axis 2j, and the micro area 2hm of the phosphor 2h irradiated with the light of wavelength λA is temporally changed. Therefore, the concentration of the energy of the light of wavelength λA in the same micro area 2hm is avoided, and the phosphor 2h is prevented from deteriorating in property. In addition, the rotation speed of the disc-shaped base 2g is not specifically limited.

In Embodiment 1, the concentration of the energy of the light of wavelength λA in the same micro area 2hm is avoided by rotating the disc-shaped base 2g. However, it is not limited thereto. For example, a not-shown rectangular base is used instead of the disc-shaped base 2g, the phosphor 2h extending in the longitudinal direction of the rectangular base is formed, and the rectangular base periodically reciprocates in the vertical direction and the longitudinal direction relative to the light of wavelength λA, so as to temporarily change the micro area 2hm of the phosphor 2h irradiated with the light of wavelength λA.

The phosphor 2h is excited with the light of wavelength λA so as to generate fluorescent light of wavelength λB longer than the wavelength λA, as illustrated in FIG. 1. The fluorescent light is for example green fluorescent light, and the range of wavelength λB is 495 nm<λB<570 nm.

The fluorescent light of wavelength λB is reflected by the disc-shaped base 2g, is condensed by the condensing element 2i, and is emitted from the fluorescent wheel 2e.

The reflection/transmission wheel 2b rotates about the rotation axis 2m by a driver 2n as a first driver. The reflection/transmission wheel 2b includes a fan-shaped reflection area 2p surrounded by two boundary area lines $2r_1$, $2r_2$ in the radial direction and an arc line $2r_3$.

The reflection area 2p totally reflects the light of wavelength λA. The remaining area of the reflection/transmission wheel 2b except for the reflection area 2p is the transmission area 2q which totally transmits the light of wavelength λA.

In Embodiment 1, the reflection/transmission wheel 2b is a transparent disc. The fan-shaped reflection area 2p is formed in the disk-shaped reflection/transmission wheel 2b and the transmission area 2q is formed in the remaining area of the reflection/transmission wheel 2b except for the reflection area 2p. However, if the reflection/transmission wheel 2b is made up of the fan-shaped reflection area 2p, fewer materials are required and the costs can be lowered.

In Embodiment 1, the angle of the fan-shaped reflection area 2p around the rotation axis 2m is 90 degrees. However, the size of the reflection area 2p is not limited thereto.

In Embodiment 1, the reflection area 2p and the transmission area 2l are periodically switched by rotating the reflection/transmission wheel 2b. However, the reflection area 2p and the transmission area 2q can be switched by reciprocating the reflection/transmission wheel 2b similar to the reciprocation of the disk-shaped base 2g.

The reflection/transmission wheel 2b is inclined to the optical axis 01 of the light path of the first illumination light system 1A. In Embodiment 1, the reflection/transmission wheel 2b is inclined at 45° relative to the optical axis 01. However, this angle is not limited thereto as long as it can switch the light path of the excitation light of wavelength λA.

When a diffusion plate is used for the transmission area 2q of the reflection/transmission wheel 2b, such a configuration is effective for controlling a speckle pattern of laser light emitting from a laser diode.

The reflection/transmission wheel 2b appropriately rotates in synchronization with image data. The transmission light path and the reflection light path of the first illumination optical system 1A are appropriately selected according to a color to be created by image data. The reflection/transmission wheel 2b rotates 30 times per second, and rotates one or two times during one frame (for example, 1/30 second).

After the light of wavelength λA is emitted from the light source 2, the light is guided to the reflection/transmission wheel 2b through the coupling lens 2a. The light of wavelength λA is reflected by the reflection area 2p when the reflection area 2p of the reflection/transmission wheel 2b exists in the emission light path of the first illumination optical system 1A, and the light of wavelength λA is guided to the dichroic mirror 3b in the reflection light path of the first illumination optical system 1A. On the other hand, the light of wavelength λA passes through the transmission area 2q when the transmission area 2q of the reflection/transmission wheel 2b exists in the emission light path of the first illumination optical system 1A, and the light of wavelength λA is guided to the total reflection mirror 2c in the transmission light path.
(Detailed Configuration of Second Illumination Optical System 1B)

The light source 3 is a solid-state light-emitting element which emits light of wavelength λC longer than the wavelength λB. The range of the wavelength λC is for example 620 nm<λB<750 nm. The light source 3 emits red light. In addition, reference 02 illustrates the optical axis of the second illumination optical system 1B.

The dichroic mirror 3b reflects the light of wavelength λA, and transmits the light of wavelength λC; and the dichroic mirror 3c transmits the light of wavelength λA and the light of wavelength λC, and reflects the light of wavelength λB.
(Detailed Description of Light Path by Reflection/Transmission Wheel 2b and Dichroic Mirror 3b, 3c)

When the reflection area 2p of the reflection/transmission wheel 2b exists in the emission light path of the first illumination optical system 1A, the light of wavelength λA is reflected by the reflection area 2p, is guided to the dichroic mirror 3b, and is reflected thereby. Then, the light reflected by the dichroic mirror 3b passes through the dichroic mirror 3c, and is emitted from the illumination optical system 1 as blue light.

When the transmission area 2q of the reflection/transmission wheel 2b exists in the emission light path of the first illumination optical system 1A, the light of wavelength λA passes through the transmission area 2q, and is reflected by the total reflection mirror 2c. Then, the light reflected by the total reflection mirror 2c passes through the dichroic mirror 3c, and is guided to the fluorescent wheel 2e.

The light of wavelength λA is concentrated by the condensing element 2i, and irradiates the micro region 2hm of the phosphor 2h (refer to FIG. 2), so that the micro region 2hm of the phosphor 2h is excited, and the micro region 2hm generates fluorescent light of wavelength λB.

The light of wavelength λA and the fluorescent light of wavelength λB are reflected by the disc-shaped base 2g, are concentrated by the condensing element 2i, and are guided to the dichroic mirror 3c. The light of wavelength λA passes through the dichroic mirror 3c, and the light of wavelength λB is reflected by the dichroic mirror 3c, so as to be emitted from the illumination optical system 1 as green light.

The light of wavelength λC is guided to the dichroic mirror 3b through the coupling lens 3a, and passes through the dichroic mirrors 3b, 3c, so as to be emitted from the illumination optical system 1 as red light.

The dichroic mirror 3c operates as a light path-combining optical element which forms a combined light path by combining the reflection light path and the transmission light path split by the reflection/transmission wheel 2b.

According to Embodiment 1, with the reflection/transmission wheel 2b, the emission light path of the excitation light is alternately switched between the transmission light path and the reflection light path in a unit time (1 second). The illumination time of the excitation light to the phosphor per unit time can be reduced, so that further deterioration in a fluorescent property of the phosphor can be avoided.
(Problem in Color Mixing in Boundary Area Between Reflection Area 2p and Transmission Area 2q of Reflection/Transmission Wheel 2b)

Figure 4:
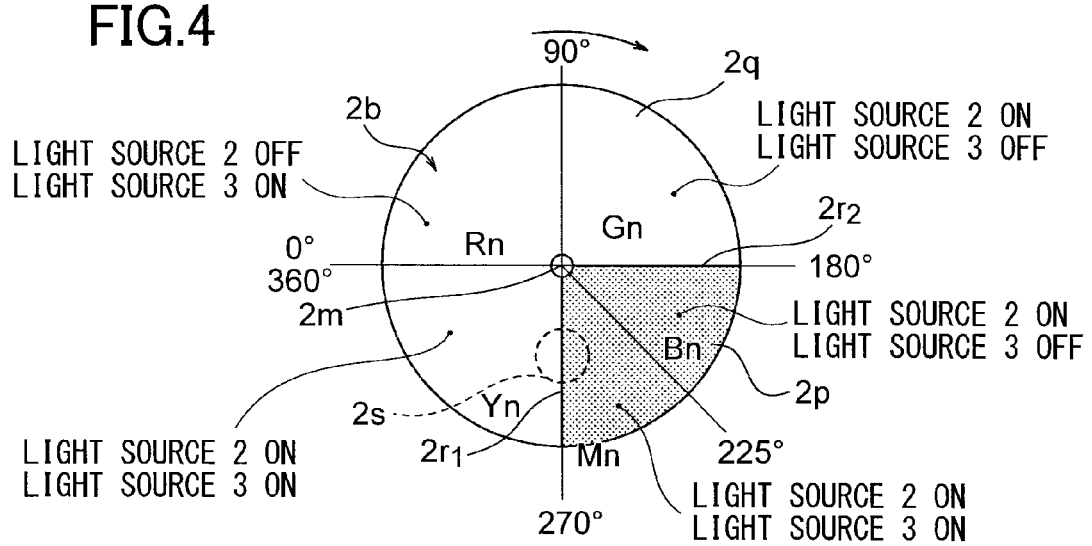
FIG. 4 is a view illustrating a relationship between the reflection/transmission wheel and an emission light path of a first illumination optical system illustrated in FIG. 1.

The light of wavelength λA has predetermined spread, and passes through the reflection/transmission wheel 2b as illustrated in FIG. 4. More specifically, the light of wavelength λA irradiates the reflection/transmission wheel 2b as a spot. In FIG. 4, reference 2s illustrates a spot area (size of emission light path) in the reflection/transmission wheel 2b, which is irradiated with the light of wavelength λA.

When the light of wavelength λA irradiates the boundary area in the reflection/transmission wheel 2b, the blue light of wavelength λA is reflected by the reflection area 2p, the light is reflected by the dichroic mirror 3b, and is emitted from the illumination optical system 1 after passing through the dichroic mirror 3c. The light of wavelength λA after passing through the transmission area 2q is reflected by the total reflection mirror 2c, and is guided to the fluorescent wheel 2e after passing through the dichroic mirror 3c. The light guided to the fluorescent wheel 2e excites the phosphor 2h of the fluorescent wheel 2e, and the green fluorescent light (wavelength λB) of the phosphor 2h is reflected by the dichroic mirror 3c so as to be emitted from the illumination optical system 1.

As a result, the light of the mixture of blue light and green light is emitted from the illumination optical system 1. Color mixing therefore occurs when the boundary area line $2r_1$, $2r_2$ between the reflection area 2p and the transmission area 2q of the reflection/transmission wheel 2b crosses the emission light path of the first illumination optical system 1A. Consequently, a cyan image is periodically generated when obtaining a blue image or a green image, resulting in deterioration in color purity.

In Embodiment 1, the light source 2 is therefore turned off, and the light source 3 is turned on in synchronization with the turning off of the light source 2 when the boundary area line $2r_1$, $2r_2$ between the reflection area 2p and the transmission area 2q of the reflection/transmission wheel 2b crosses the emission light path of the first illumination optical system 1A.

Color mixing, which occurs when the boundary area line $2r_1$, $2r_2$ between the reflection area 2p and the transmission area 2q of the reflection/transmission wheel 2b crosses the emission light path of the first illumination optical system 1A, can be thereby prevented, so that color reproducibility can be improved.

The on/off timing of the light sources 2, 3, the rotation angle position of the reflection/transmission wheel 2b, and the emission in synchronization with the after-described image generator are controlled. Therefore, a decrease in brightness due to the turning off of the light source 2 when the boundary area line $2r_1$, $2r_2$ between the reflection region 2p and the transmission region 2q of the reflection/transmission wheel 2b sequentially crosses the emission light path of the first illumination optical system 1A can be prevented. The details of the turning on/off control will be described later.

Embodiment 2

Figure 5:
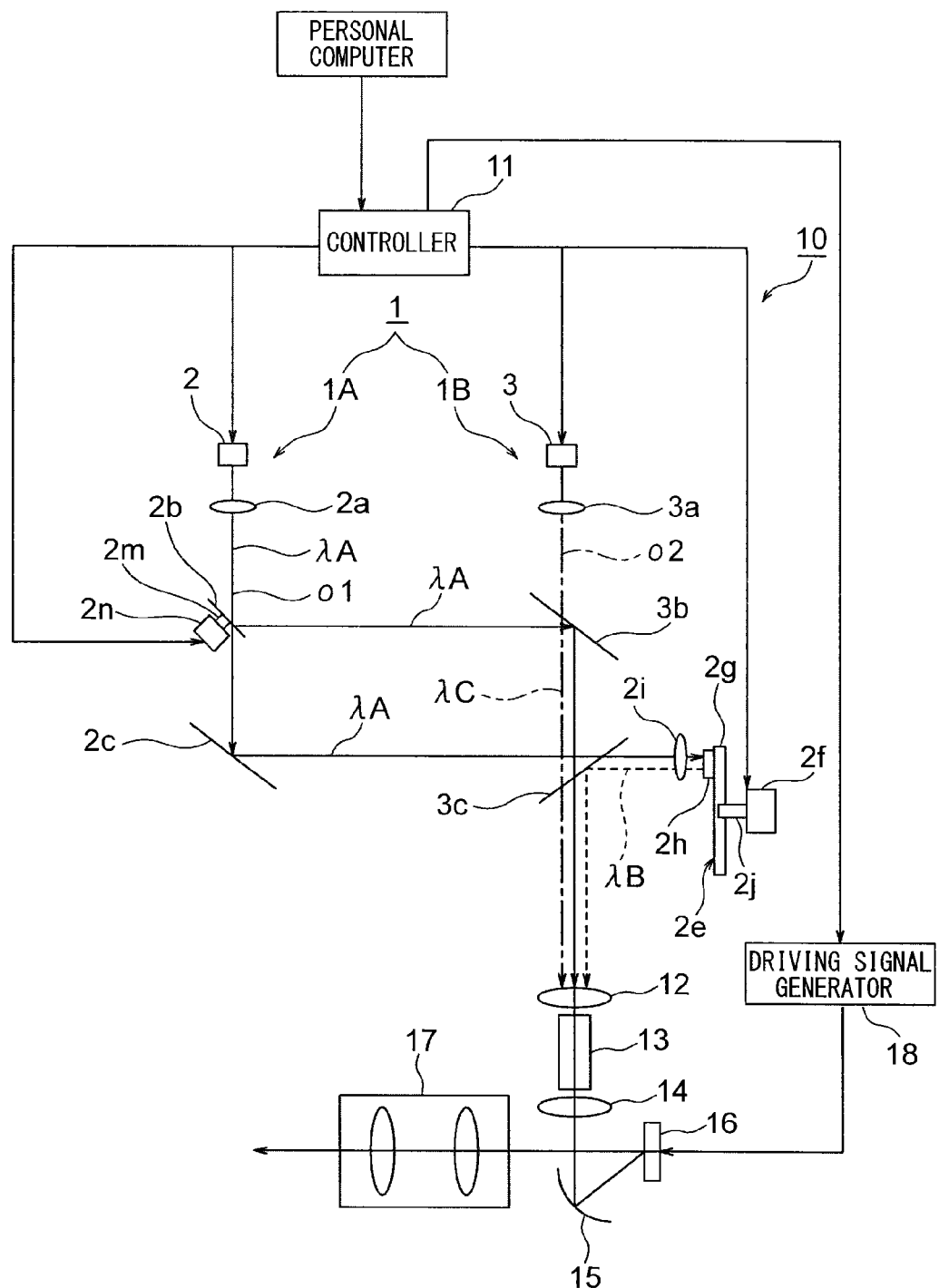
FIG. 5 is a view illustrating a projector according to Embodiment 2 using the illumination light source system illustrated in FIG. 1.

FIG. 5 illustrates one example of the configuration of a projector 10 using the illumination optical system 1 in Embodiment 1. In FIG. 5, the reference numbers which are the same as those in Embodiment 1 are applied to the configurations which are the same as those in Embodiment 1; thus, the detailed description thereof will be omitted.

The projector 10 includes a controller 11 which controls the illumination optical system 1, condensing element 12, integrator 13, condensing element 14, reflection mirror 15, image generator 16, and projection lens 17 provided in front of the light path of the illumination optical system 1. The condensing element 12, integrator 13, condensing element 14, reflection mirror 15, image generator 16, and projection lens 17 constitute an image projection optical system.

The illumination light beams of wavelengths λA, λB, λC are concentrated by the condensing element 12, and are equally dispersed by the integrator 13 in plane, so that uneven light volume is eliminated, and the illumination light beams irradiate the image generator 16 through the condensing element 14 and the reflection mirror 15. The configuration and operation of the image generator 16 are firstly described below before the configuration and operation of the controller 11 are described.

(Configuration and Operation of Image Generator 16)

The image generation data is input to the image generator 16. The image generator 16 is for example a known DMD (Digital Micromirror Device).

The DMD includes a pixel-based micromirror. The angle of the micromirror is two-position controlled. The tone control can be performed by controlling the repeating time interval of the two-position control of the angle.

R (red: wavelength λC), G (green: wavelength λB), and B (blue: wavelength λA) light irradiate in order during one frame period of an image, and the image generator 16 drives according to a micromirror-driving signal based on the image generation data with respect to each display pixel in synchronization with the irradiation timing of RGB light. With this configuration, a full-color image is generated based on the image generation data by using a residual image phenomenon of the eyes.

(Configuration and Operation of Controller 11)

The controller 11 includes a CPU (Central Processing Unit), ROM (Read-Only Memory) and RAM (Random Access Memory).

The controller 11 controls the entire operation of the projector 10 by using the RAM as a work memory in accordance with a program previously stored in the ROM.

The controller 11 includes a not-shown interface relative to an external information device, and the controller 11 loads image data from a personal computer, for example.

The controller 11 performs an image process on the loaded image data, and generates the already-described image generation data which drives the image generator 16.

The image generation data is input to the driving signal generator 18. The driving signal generator 18 generates a driving signal based on the image generation data. The driving signal is output to the image generator 16.

The controller 11 controls the turning on/off of the light sources 2, 3 and the rotation of the drivers 2f, 2n.

Hereinafter, one example of control with the controller 11 will be described with reference to FIG. 6.

Figure 6:
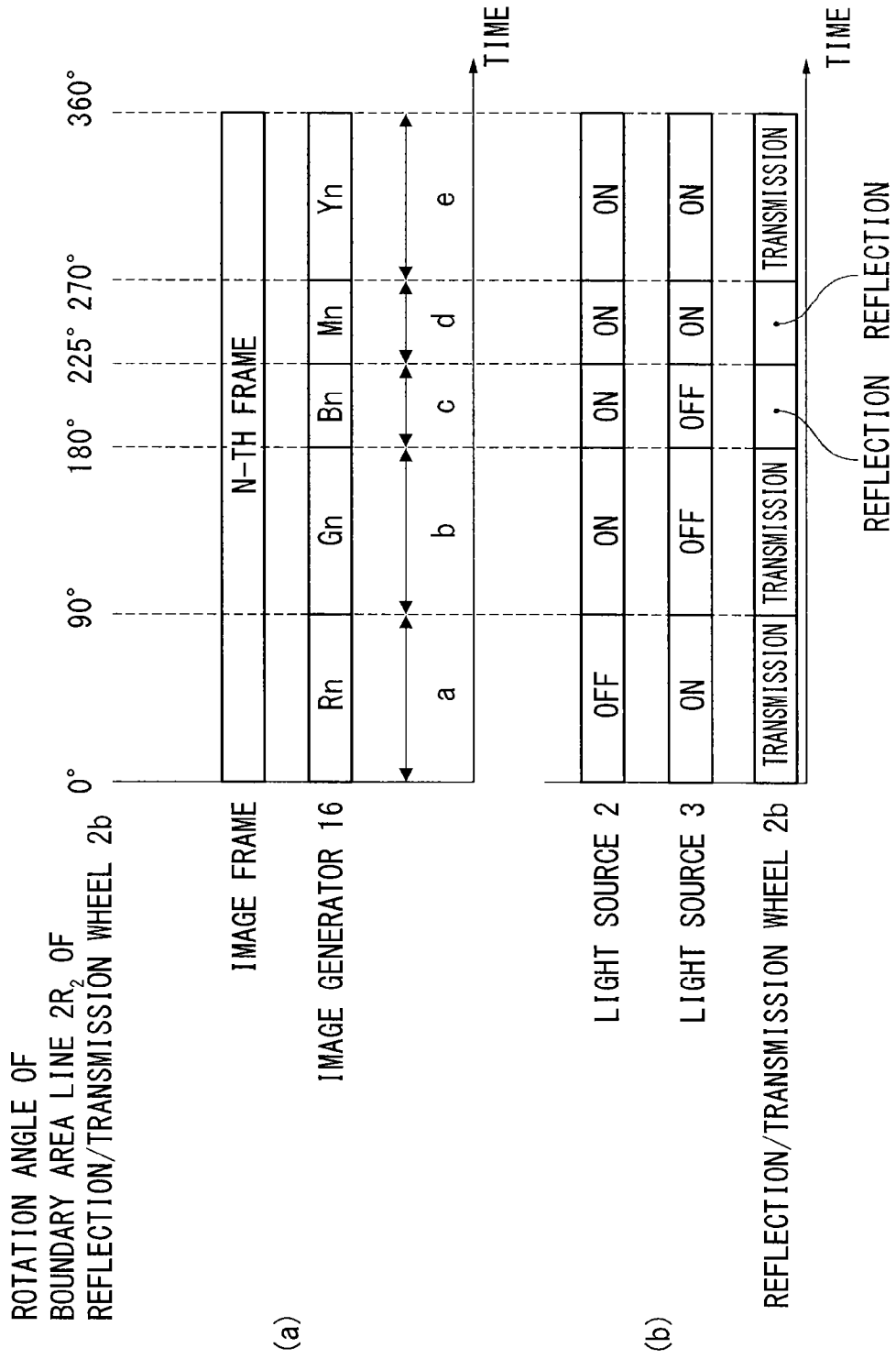
FIG. 6 is a view illustrating one example of a relationship among colors of light irradiating an image generator illustrated in FIG. 5, an on/off timing of each light source, and transmission/reflection of a reflection/transmission wheel relative to an image frame.

FIG. 6 provides a view illustrating a generation period (for example, T=1/30 second) of n-th image frame, which is divided into five periods, for example, in accordance with the rotation angle positions of the reflection/transmission wheel 2b. The respective five periods are illustrated by reference signs a-e. The light beams irradiating the image generator 16 during the respective periods a-e are Rn (red), Gn (green), Bn (blue), Mn (magenta), and Yn (yellow), respectively.

FIG. 6 also provides a view illustrating the on/off timing of the light sources 2, 3 and the transmission/reflection timing of the reflection/transmission wheel 2b in accordance with each period a-e. During the period a, namely, while the boundary area line $2r_2$ is located in the rotation angle position at 0-90 degrees, the emission light path of the first illumination optical system 1A is located in the transmission area 2q, so that the light source 2 is turned off and the light source 3 is turned on by the controller 11. Thus, the red (Rn) light from the second illumination optical system 1B irradiates the image generator 16.

During the period b, namely, while the boundary area line $2r_2$ is located in the rotation angle position at 90-180 degrees, the light source 2 is turned on and the light source 3 is turned off by the controller 11, and the rotation angle position of the reflection/transmission wheel 2b is controlled by the controller 11 in synchronization with the on/off timing of the light sources 2, 3 such that the transmission area 2q is located in the emission light path of the first illumination optical system 1A by the controller 11. Thus, the green (Gn) light irradiates the image generator 16.

During the period c, namely, while the boundary area line $2r_2$ is located in the rotation angle position at 180-225 degrees, the light source 2 is turned on and the light source 3 is turned off by the controller 11, and the rotation angle position of the reflection/transmission wheel 2b is controlled by the controller 11 in synchronization with the on/off timing of the light sources 2, 3 such that the reflection area 2p is located in the emission light path of the first illumination optical system 1A. Thus, the blue (Bn) light irradiates the image generator 16.

During the period d, namely, while the boundary area line $2r_2$ is located in the rotation angle position at 225-270 degrees, the light source 2 and the light source 3 are turned on at the same time by the controller 11, and the rotation angle position of the reflection/transmission wheel 2b is controlled by the controller 11 such that the reflection area 2p is located in the emission light path of the first illumination optical system 1A. Thus, the blue (Bn) light and the red (Rn) light are emitted from the illumination optical system 1 at the same time, and the magenta (Mn) light therefore irradiates the image generator 16 based on a principle of an additive color process.

During the period e, namely, while the boundary area line $2r_2$ is located in the rotation angle position at 270-360 degrees, the light source 2 and the light source 3 are turned on at the same time by the controller 11, and the rotation angle position of the reflection/transmission wheel 2b is controlled by the controller 11 such that the transmission area 2q is located in the emission light path of the first illumination optical system 1A by the controller 11. Thus, the green (Gn) light and the red (Rn) light are emitted from the illumination optical system 1 at the same time, and the yellow (Yn) light therefore irradiates the image generator 16 based on a principle of an additive color process.

As described above, according to Embodiment 2, one frame period is divided into five periods, and each of red, green, blue, purple and yellow light irradiates the image generator 16 in each period. A full color image can be therefore generated by using a residual image phenomenon of the eyes, and the tone can be controlled by the illumination timing of each red, green, blue, purple, and yellow light and the two-position control of the angle of each DMD.

In this embodiment, the rotation angle position of the boundary area line $2r_2$ is given regardless of the size of the emission light path of the first illumination optical system 1A, namely, the size of the spot region 2s for simplifying the description. In FIG. 4, the on/off timing of the light sources 2, 3 and the colors of light irradiating the image generator 16 are illustrated to be easily understood.

According to Embodiment 2, the reflection light path formed by the reflection area $2p$ of the reflection/transmission wheel $2b$ can be used together because a reflection member is used for the disc-shaped base $2g$ for use in the fluorescent wheel $2e$. With this configuration, the size of the illumination optical system 1 can be reduced.

(Detailed Description of Rotation Angle Position Control of Reflection/Transmission Wheel $2b$ by Controller 11)

The reflection/transmission wheel $2b$ rotates about a rotation axis $2m$ so as to cross the emission light path of the first illumination optical system 1A as illustrated in FIG. 7A.

Figure 7:
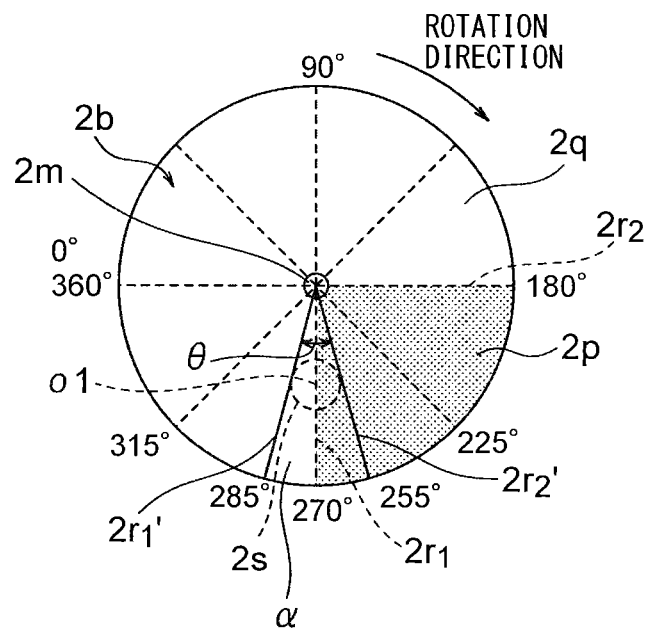
FIG. 7 is a view illustrating a relationship between a rotation angle position of the reflection/transmission wheel illustrated in FIG. 1 and the emission light path of the first illumination optical system illustrated in FIG. 1.

In FIG. 7, a circular spot area $2s$ similar to the emission light path is illustrated by the dashed line instead of the emission light path of the illumination light system 1 for simplifying the description.

The boundary area lines $2r1$, $2r2$ between the reflection area $2p$ and the transmission area $2q$ cross the spot area $2s$ once in one rotation of the reflection/transmission wheel $2b$.

In FIG. 7, the rotation angle positions of the reflection/transmission wheel $2b$ during one rotation are appropriately illustrated by angles in the clockwise direction with the horizontal line as a reference position at 0 degrees.

In FIG. 7, two tangential lines which extend from the center of the rotation axis $2m$ in the radial direction and have contact with the circle of the spot area $2s$ are illustrated by reference $2r_{1'}$, $2r_{2'}$.

An angle θ formed by the two tangential lines $2r_{1'}$, $2r_{2'}$, is determined based on a radius of the circle of the spot area $2s$ and a distance from the center of the rotation axis $2m$ to the center (optical axis 01) of the spot area $2s$.

In this case, the angle θ is for example 30 degrees. When the boundary area line $2r_1$ or the boundary area line $2r_2$ exists in a fan-shaped area a surrounded by the two tangential lines $2r_{1'}$, $2r_{2'}$, and the circular arc, the light (blue) of wavelength λA passes through the transmission area $2q$ and is reflected by the reflection area $2p$ as described above while the light source 2 is turned on.

For this reason, color mixing of the light (blue) of wavelength λA reflected by the reflection area $2p$ and the dichroic mirror $3b$ and the light (green) of wavelength λB generated by the fluorescent wheel $2e$ occurs.

Figure 8:
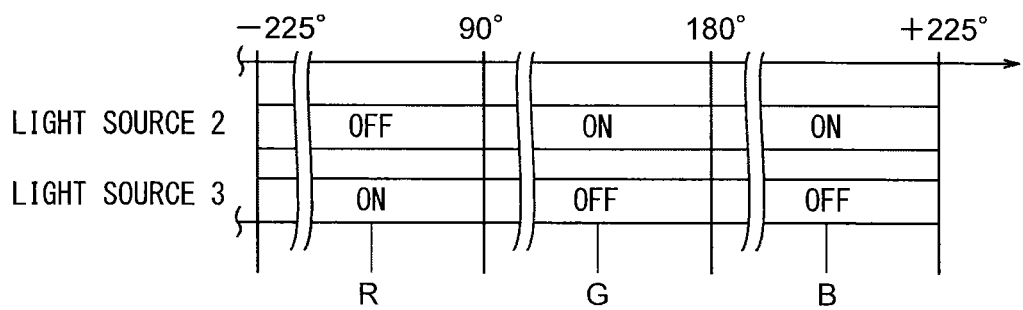
FIG. 8 is a view illustrating a rotation angle position of a reflection/transmission wheel illustrated in FIG. 7 and an on/off timing of each light source.

As illustrated in FIG. 8, in Embodiment 2, the controller 11 turns off the light source 2 and turns on the light source 3 when the rotation angle position of the boundary area line $2r_2$ of the reflection/transmission wheel $2b$ is located in the position at −255 (previous rotation angle position) to 90 degrees. The controller 11 also turns on the light source 2 and then turns off the light source 3 when the rotation angle position of the reflection/transmission wheel $2b$ is located in the position at 90 to +255 degrees (present rotation angle). R, G, B colors are thereby obtained.

In FIG. 7, the light source 2 is turned on and the light source 3 is turned off within the range from 90 to 180 degrees of the rotation angle position of the boundary area line $2r_2$ of the reflection/transmission wheel $2b$, such that the Gn (green) light irradiates the image generator 16; and the light source 2 is turned on and the light source 3 is turned off within the range from 180 to 255 degrees of the rotation angle position of the boundary area line $2r_2$ of the reflection/transmission wheel $2b$, such that the Bn (blue) light irradiates the image generator 16. However, these are not limited thereto because the on/off of the light sources 2, 3 are defined by using image data in principle.

Namely, these can be any configuration as long as the light source 2 is turned off or the light volume of the light source 2 is reduced when at least one of the boundary area lines $2r_1$, $2r_2$ between the reflection area $2p$ and the transmission area $2q$ crosses the spot area $2s$ while the light source 2 is turned on.

Color mixing which occurs when the boundary area line $2r_1$, $2r_2$ (boundary region) of the reflection/transmission wheel $2b$ crosses the spot area $2s$ can be avoided. A decrease in brightness of an image can be prevented because the light source 3 is turned on when the boundary area line $2r_2$ of the reflection/transmission wheel $2b$ crosses the spot area $2s$. However, it is not always necessary to turn on the light source 3 although the effect which can prevent a decrease in brightness of an image can be achieved by turning on the light source 3.

(Description of Block Diagram of Specific Control of Controller 11)

Figure 9:
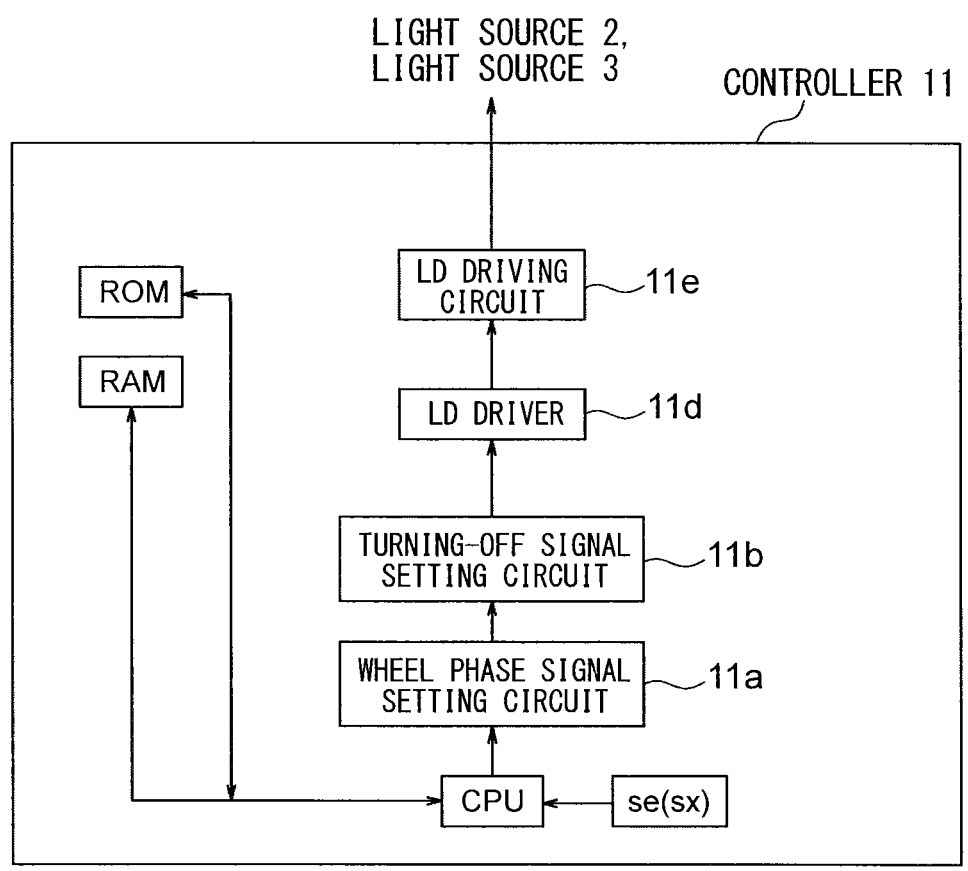
FIG. 9 is a block diagram illustrating a configuration of a controller illustrated in FIG. 5.

FIG. 9 is a block diagram illustrating the configuration of the controller 11. The controller 11 includes a CPU, ROM, and RAM as described above. The controller 11 controls the entire operation of the projector 10 by using the RAM as a work memory in accordance with the program stored in the ROM.

The controller 11 includes a wheel phase signal-setting circuit $11a$, turning-off signal-setting circuit $11b$, LD driver $11d$, and LD-driving circuit $11b$ in addition to the above circuit elements. The wheel phase signal-setting circuit $11a$ sets a wheel phase by obtaining the rotation angle position with the after-described sensor Se.

Figure 10A:
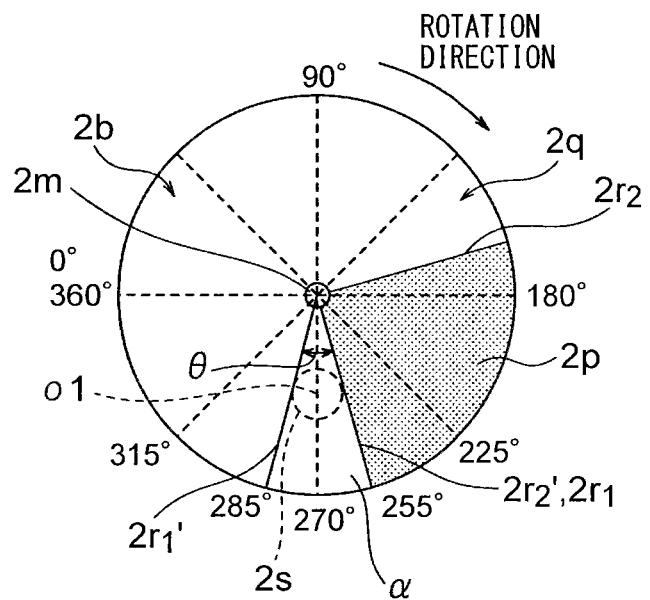
FIGS. 10A, 10B are views describing that a boundary area of the reflection/transmission wheel crosses a spot area.
Figure 10B:
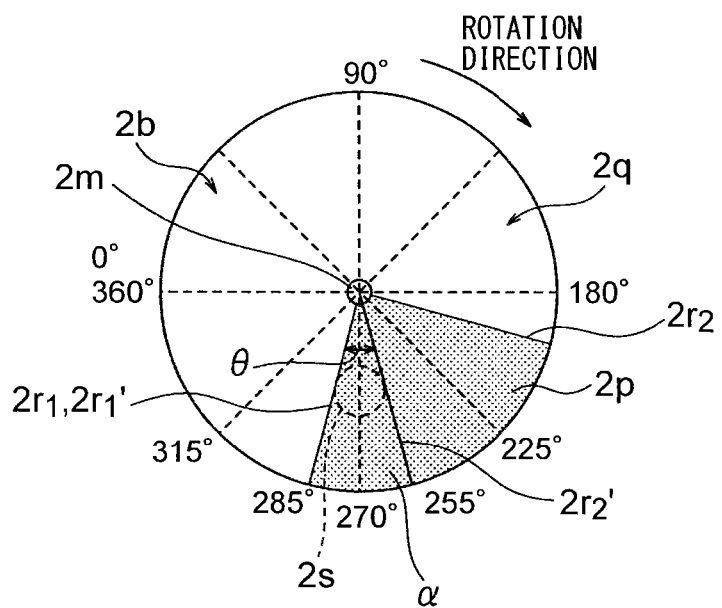
Figure 11:
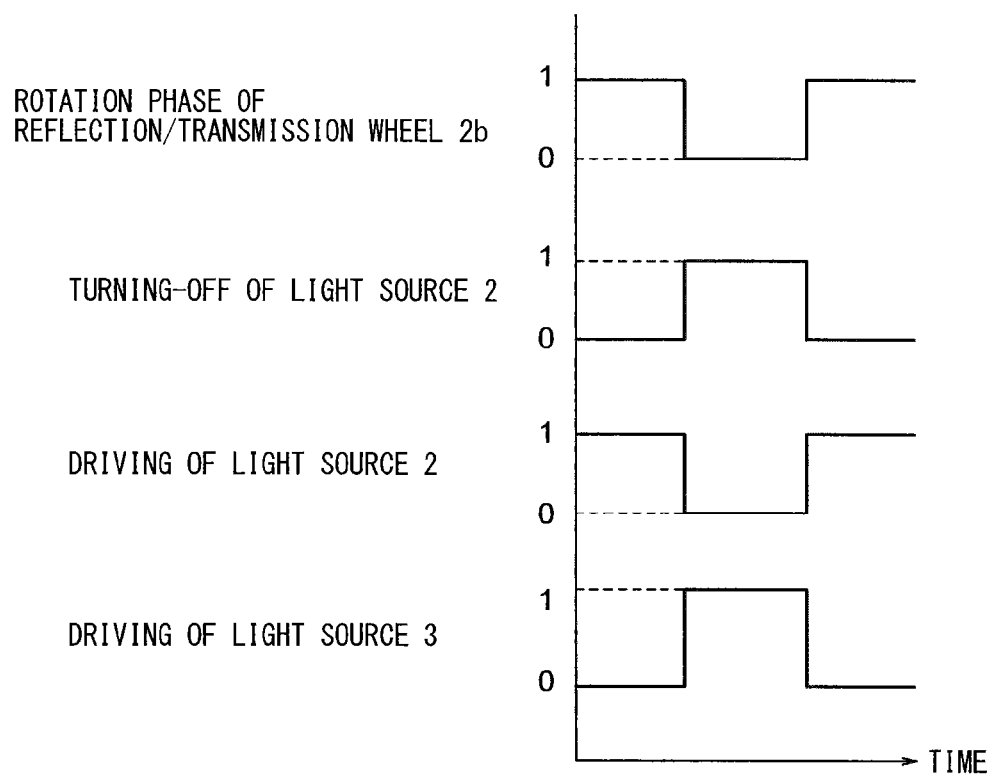
FIG. 11 is a timing view illustrating a relationship between a rotation phase of the reflection/transmission wheel and turning-off/driving of each light source.

The controller 11 sets the wheel phase to "0" from "1" as illustrated in FIG. 11 by the wheel phase signal-setting circuit $11a$ when the boundary area line $2r_1$ (or boundary region $2r_2$) is overlapped with one tangential line $2r_{2'}$ which has contact with the circle of the spot area $2s$ as illustrated in FIG. 10A. The controller 11 sets the wheel phase to "1" from "0" by the wheel phase signal-setting circuit $11a$ when the boundary area line $2r_1$ (or boundary area line $2r_2$) is overlapped with the other tangential line $2r_{1'}$ which has contact with the circle of the spot region $2s$ as illustrated in FIG. 10B.

The tuning-off signal-setting circuit $11b$ sets the turning-off signal which turns off the light source 2 to "1" from "0" while setting the driving signal which drives the light source 2 to "0" from "1" when the wheel phase is set to "0" from "1" by the wheel phase-single setting circuit $11a$ with reference to the rotation phase signal.

The LCD driver $11d$ sets the turning-on signal which turns on the light source 2 to "0" from "1" while setting the driving signal which drives the light source 2 to "1" from "0" when the wheel phase is set to "1" from "0" by the wheel phase signal-setting circuit $11a$. The LD driver $11d$ sets the driving signal which drives the light source 3 to "1" from "0" when the wheel phase is set to "0" from "1".

In this embodiment, the light source 2 is turned off and the light source 3 is turned on when the rotation angle position of the reflection/transmission wheel $2b$ is in the range at −255 to 90 degrees. However, the light source 2 can be turned off when the rotation angle position of the reflection/transmission wheel $2b$ is located in a predetermined rotation angle position at less than 255 degrees. With this configuration, color mixing can be reliably prevented even with the delay of the startup and shutdown of the light source 2.

In this embodiment, θ=30 degrees. However, the angle is not limited to θ=30 degrees because the angle θ is defined in accordance with the radius of the circle of the spot area $2s$ and the distance from the center of the rotation axis $2m$ to the center (optical axis 01) of the spot region $2s$.

(One Example of Rotation Angle Position Detection Sensor (Rotation Angle Detector or Boundary Region Detector) of Reflection/Transmission Wheel 2b)

Figure 12:
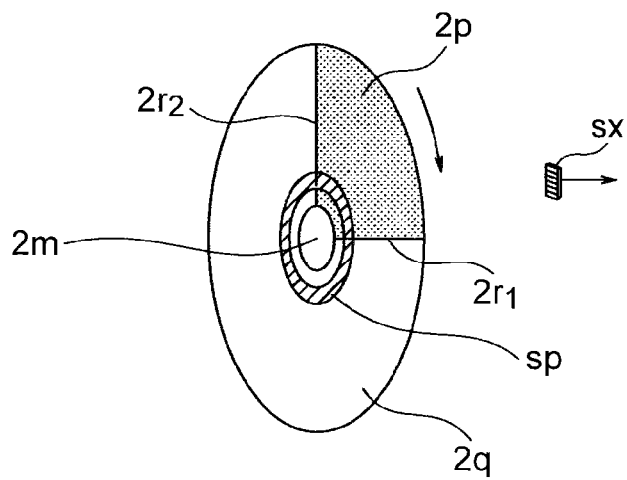
FIG. 12 is a schematic view illustrating one example of a sensor which detects the rotation angle position of the reflection/transmission wheel.

As illustrated in FIG. 12, a ring-shaped rotation angle position detection pattern Sp is formed near the rotation axis 2m to surround the rotation axis 2m in the reflection/transmission wheel 2b.

An image-receiving element Sx as a part of an encoder is provided in a position facing the rotation angle position detection pattern Sp. When the rotation angle position detection pattern Sp crosses the spot area 2s, the image of the rotation angle position detection pattern Sp in the crossing is received in the image-receiving element Sx. The image-receiving element Sx and the rotation angle position detection pattern Sp constitute the above-described sensor Se.

The image-receiving element Sx outputs the image-receiving signal to the CPU. The rotation angle position detection pattern Sp corresponds to the rotation angle position one by one. The CPU thereby detects the rotation angle position of the reflection/transmission wheel 2b.

A potentiometer whose resistance value is changed in proportion to a rotation angle can be used as the sensor Se instead of the sensor Se including the rotation angle position detection pattern Sp and the image-receiving element Sx.

Figure 13:
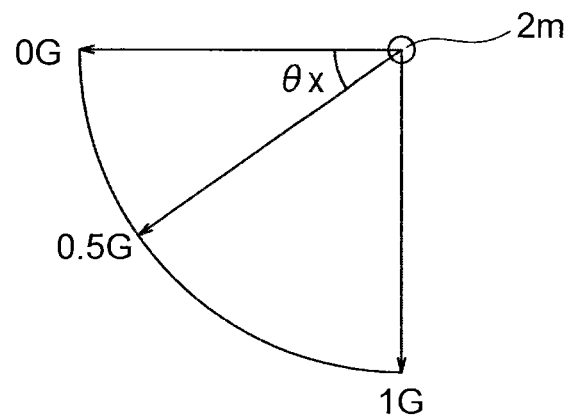
FIG. 13 is a schematic view illustrating a relationship between a rotation angle position and a gravity acceleration of an acceleration sensor.

The rotation angle position of the reflection/transmission wheel 2b can be detected by using an acceleration sensor. The not-shown acceleration sensor has acceleration "0G" while locating in the horizontal direction and has acceleration "1G" while locating in the vertical direction as illustrated in FIG. 13. The angle θx and the acceleration have a sine relationship.

An acceleration sensor can be attached to the rotation axis 2m of the reflection/transmission wheel 2b. The rotation angle position of the reflection/transmission wheel 2b can be detected by converting the gravity acceleration G detected by the acceleration sensor into the rotation angle position with a sine function in accordance with the correspondence between the gravity acceleration G and the rotation angle position of the reflection/transmission wheel 2b. In addition, the rotation angle position detection of the reflection/transmission wheel 2b is not limited thereto.

As described above, according to Embodiment 2, the turning on/off of the light source 2 is controlled when the boundary area line $2r_1$, $2r_2$ between the transmission area 2q and the reflection area 2p crosses the spot area 2s. However, the turning on/off of the light sources 2, 3 can be controlled according to image data during a time period in addition to the time period that the boundary area line $2r_1$, $2r_2$ between the transmission region 2q and the reflection region 2p crosses the spot region 2s.

Embodiment 3

Figure 14:
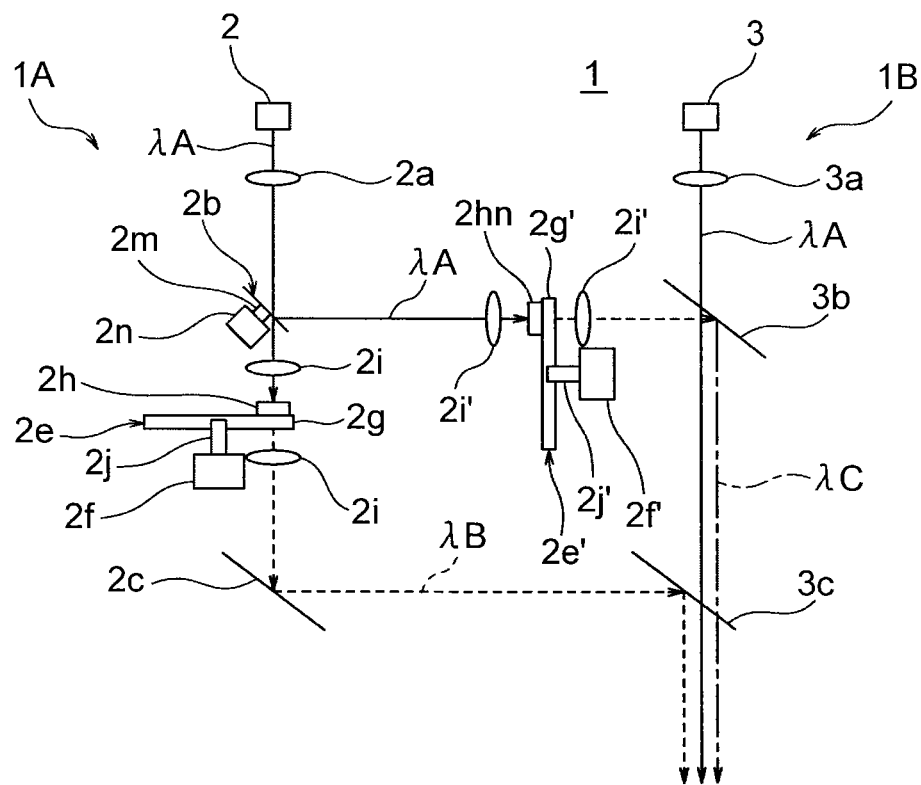
FIG. 14 is an optical view illustrating an illumination light source system according to Embodiment 3 of the present invention.

FIG. 14 is a view illustrating an illumination light source system according to Embodiment 3.

In Embodiment 3, a light source (for example, blue laser diode) which generates light of wavelength λA is used for both of the light source 2 of the first illumination optical system 1A and the light source 3 of the second illumination optical system 1B. The configurations of the coupling lens 2a, reflection/transmission wheel 2b, driver 2n, and rotation axis 2m disposed in the first illumination optical system 1A, and the configuration of the coupling lens 3a of the second illumination optical system 1B are the same as those in Embodiment 1.

A fluorescent wheel 2e as a second fluorescent wheel is provided in the transmission light path of the first illumination optical system 1A, and a pair of condensing elements 2i is provided to have the rotation base 2g of the fluorescent wheel 2e therebetween. The rotation base 2g of the fluorescent wheel 2e is made of a transmission member in Embodiment 3.

The fluorescent properties of the phosphor 2h of the fluorescent wheel 2e are similar to those in Embodiment 1. The phosphor 2h is excited by the light of wavelength λA so as to generate light (green) of wavelength λB. The light of wavelength λB is concentrated by the condensing element 2i after passing through the disc-shaped rotation base 2g, and is reflected by the total reflection mirror 2c toward the dichroic mirror 3c.

A fluorescent wheel 2e' as a first fluorescent wheel is provided in the middle of the reflection light path of the first illumination optical system 1A. A disc-shaped rotation base 2g' of the fluorescent wheel 2e' is made of a transmission member similar to the disc-shaped rotation base 2g of the fluorescent wheel 2e.

A pair of condensing elements 2i' is provided to have the disc-shaped rotation base 2g' therebetween. A ring-shaped phosphor 2hn is formed on the disc-shaped rotation base 2g'. The phosphor 2hn is excited by the light of wavelength λA, and generates light (red) of wavelength λC. The light of wavelength λC (red: 620-750 nm) is concentrated by the condensing element 2i' after passing through the disk-shaped rotation base 2g', and is guided to the dichroic mirror 3b.

The dichroic mirror 3b transmits the light of wavelength λA (blue: 400-450 nm) and reflects the light of wavelength λC (red: 620-750 nm). The light of wavelength λC is reflected by the dichroic mirror 3b, and is guided to the dichroic mirror 3c.

The dichroic mirror 3c transmits the light of wavelength λA and the light of wavelength λC, and reflects the light of wavelength λB.

According to Embodiment 3, the light of wavelength λA from the light source 3 of the second illumination optical system 1B is transmitted through the dichroic mirrors, 3b, 3c, and is emitted from the illumination optical system 1.

The light of wavelength λA from the light source 2 is reflected by the reflection area 2p when the reflection area 2p of the reflection/transmission wheel 2b is located in the emission light path of the first illumination optical system 1A, and is guided to the fluorescent wheel 2e' provided in the reflection light path, so that the fluorescent light of wavelength λC is generated by the excitation light of wavelength λA, and the fluorescent light of wavelength λC is reflected by the dichroic mirror 3b, and is emitted from the illumination optical system 1 after passing through the dichroic mirror 3c.

The light of wavelength λA from the light source 2 is transmitted through the transmission area 2q when the transmission area 2q of the reflection/transmission wheel 2b is located in the emission light path of the first illumination light system 1A, and the light is guided to the fluorescent wheel 2e provided in the transmission light path, so that the fluorescent light of wavelength λB is generated by the excitation light of wavelength λA, the light of wavelength λB is reflected by the total reflection mirror 2c and the dichroic mirror 3c, and is emitted from the illumination optical system 1.

(One Example of Irradiation Timing to Image Generator 16)

Figure 15:
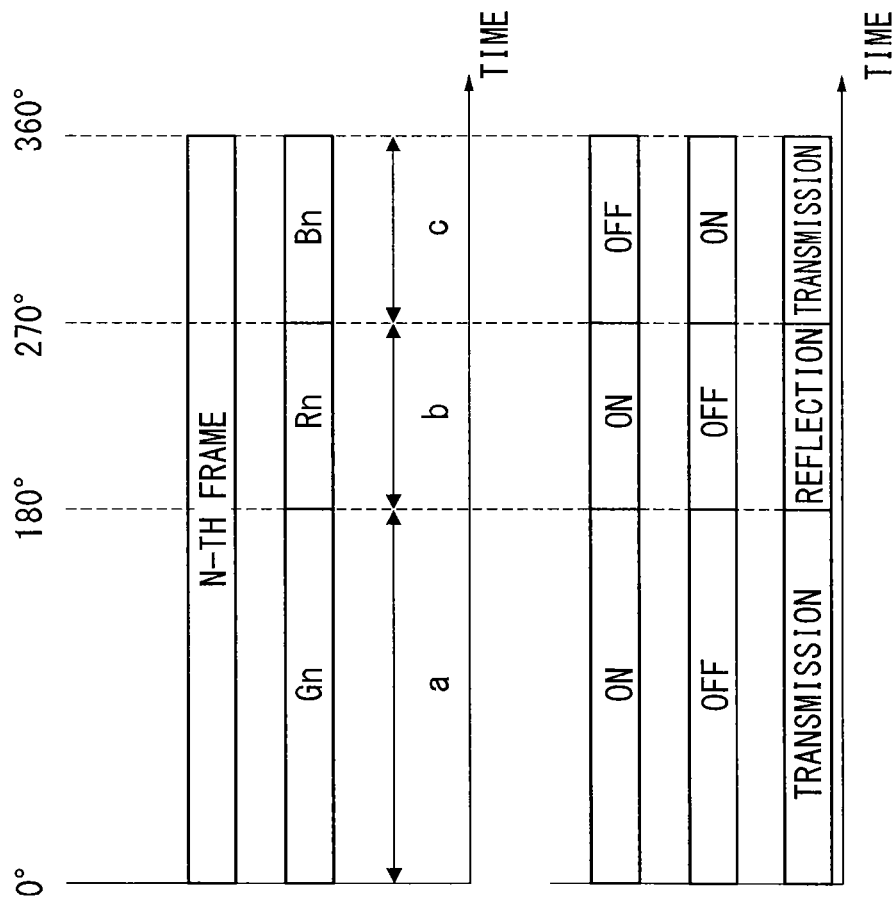
FIG. 15 is a view illustrating one example of a relationship among colors of light irradiating an image generator by using the illumination light source system illustrated in FIG. 14, an on/off timing of each light source, and transmission/reflection of a reflection/transmission wheel relative to an image frame.

FIG. 15 is a view describing one example of the relationship of the projection timing of RGB light, the on/off timing of the light sources 2, 3, and the reflection/transmission timing of the reflection/transmission wheel 2b with respect to the n-th image frame.

In this case, the generation period of the image frame is divided into three periods. The respective periods are illustrated by the reference signs a-c. During the period a, namely, while the rotation angle position of the boundary area line $2r_2$ is located in the position at 0-180 degrees, the light source 2 is turned on and the light source 3 is turned off by the controller 11, and the transmission area 2q of the reflection/transmission wheel 2b is located in the emission light path of the first illumination optical system 1A by the controller 11. The green (Gn) light of wavelength λA therefore illuminates the image generator 16.

During the period b, namely, while the rotation angle position of the boundary area line $2r_2$ is located in the position at 180-270 degrees, the light source 2 is turned on and the light source 3 is turned off by the controller 11, and the reflection area 2p of the reflection/transmission wheel 2b is located in the emission light path of the first illumination optical system 1A by the controller 11. The red (Rn) light of wavelength λC therefore illuminates the image generator 16.

During the period c, namely, while the rotation angle position of the boundary area line 2r2 is located in the position at 270-360 degrees, the light source 2 is turned off and the light source 3 is turned on by the controller 11, and the transmission area 2q of the reflection/transmission wheel 2b is located in the emission light path of the first illumination optical system 1A by the controller 11. The blue (Bn) light of wavelength λA therefore illuminates the image generator 16.

As described above, according to Embodiment 3, the GRB light illuminates the image generator 16 during one frame period, so that full-color projection as well as white color projection can be achieved by using a residual image phenomenon of the eyes.

The color can be changed by changing the length of each period a, b, c. The projection image can be tinged with red by increasing the length of the period a in the one frame period, for example. The color temperature can be changed by changing each period a, b, c with respect to each frame.

In Embodiment 3, the color mixing can be prevented and the brightness of the projection image can be improved by turning off the light source 2 and turning on the light source 3 when the boundary area line $2r_1$, $2r_2$ between the transmission area 2q and the reflection area 2p of the reflection/transmission wheel 2b crosses the spot area 2s.

(Another Example of Irradiation Timing to Image Generator 16)

Figure 16:
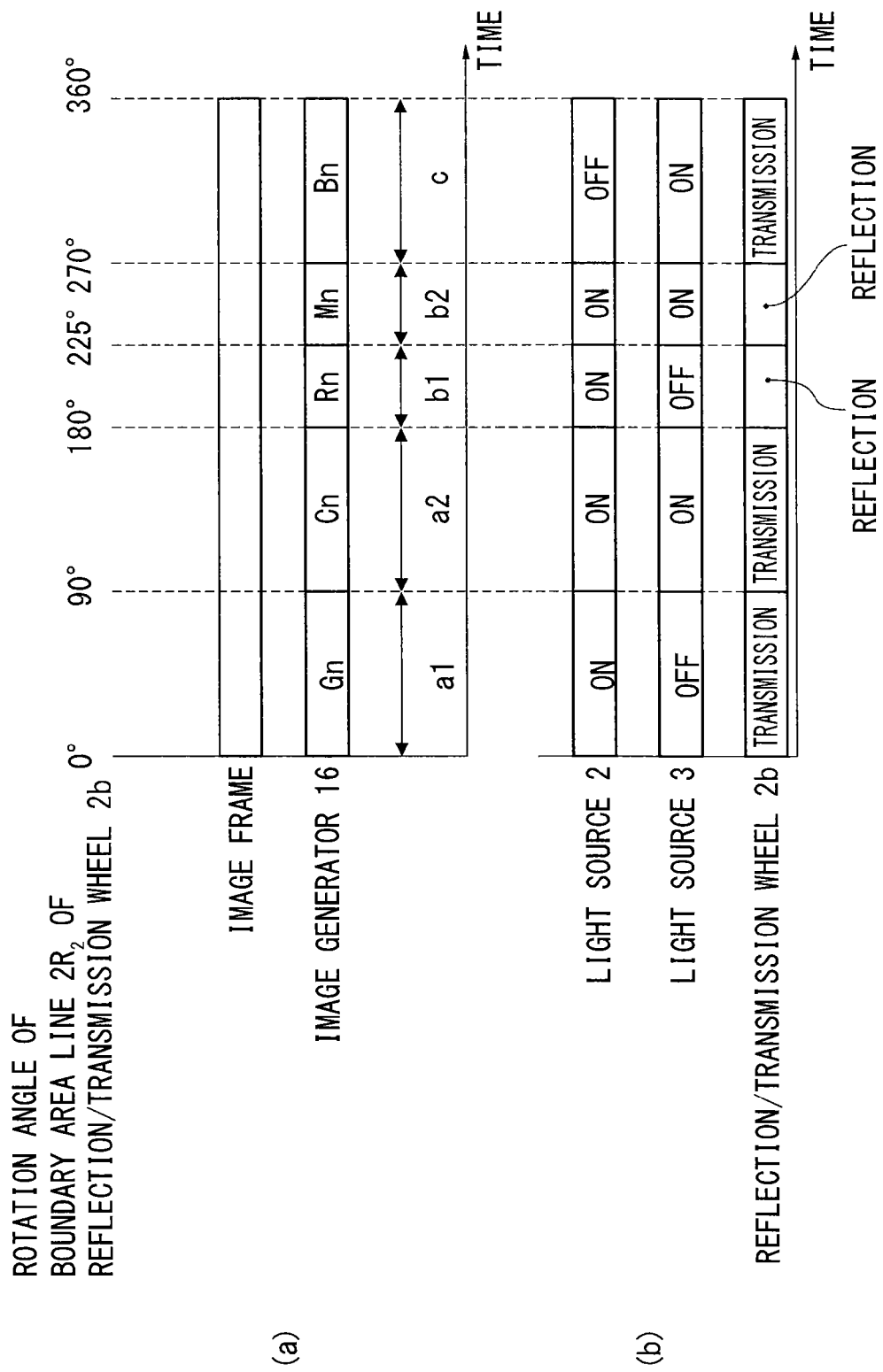
FIG. 16 is a view illustrating one example of a relationship among colors of light irradiating an image generator by using the illumination light source system illustrated in FIG. 14, an on/off timing of each light source, and transmission/reflection of a reflection/transmission wheel relative to an image frame.

FIG. 16 is a view describing another example of a relationship of the RGB light projection timing, the on/off timing of the light sources 2, 3, and the reflection/transmission timing of the reflection/transmission wheel 2b with respect to the n-th image frame.

In this example, the period a is divided into a period a1 and a period a2, and the period b is also divided into a period b1 and a period b2. During the period a1, namely, while the rotation angle position of the boundary area line $2r_2$ is located in the position at 0-90 degrees, the light source 2 is turned on and the light source 3 is turned off by the controller 11, and the transmission area 2q is located in the emission light path of the first illumination optical system 1A. The green (Gn) light of wavelength λB therefore irradiates the image generator 16.

During the period a2, namely, while the rotation angle position of the boundary area line $2r_2$ is located in the position at 90-180 degrees, the light source 2 and the light source 3 are turned on at the same time by the controller 11, and the transmission area 2q is located in the emission light path of the first illumination optical system 1A. The cyan light with the mixture of the green (Gn) light of wavelength λB and the blue (Bu) light of wavelength λA therefore is generated, and the cyan illumination light irradiates the image generator 16.

During the period b1, namely, while the rotation angle position of the boundary area line $2r_2$ is located in the position at 185-225 degrees, the light source 2 is turned on and the light source 3 is turned off by the controller 11, and the reflection area 2p is located in the emission light path of the first illumination optical system 1A. The red (Rn) light of wavelength λC therefore irradiates the image generator 16.

During the period b2, namely, while the rotation angle position of the boundary area line $2r_2$ is located in the position at 225-270 degrees, the light source 2 and the light source 3 are turned on by the controller 11, and the reflection area 2p is located in the emission light path of the first illumination optical system 1A. The magenta light with the mixture of the red (Rn) light of wavelength λC and the blue (Bu) light of wavelength λA is therefore generated, and the magenta illumination light irradiates the image generator 16.

During the period c, namely, while the rotation angle position of the boundary area line $2r_2$ is located in the position at 270-360 degrees, the light source 2 is turned off and the light source 3 is turned on by the controller 11, and the transmission area 2q is located in the emission light path of the first illumination optical system 1A. The blue (Bn) light of wavelength λA therefore irradiates the image generator 16. In this case, color mixing can be prevented while the brightness of the projection image can be improved. As a result, a brighter image can be generated.

Embodiment 4

Figure 17:
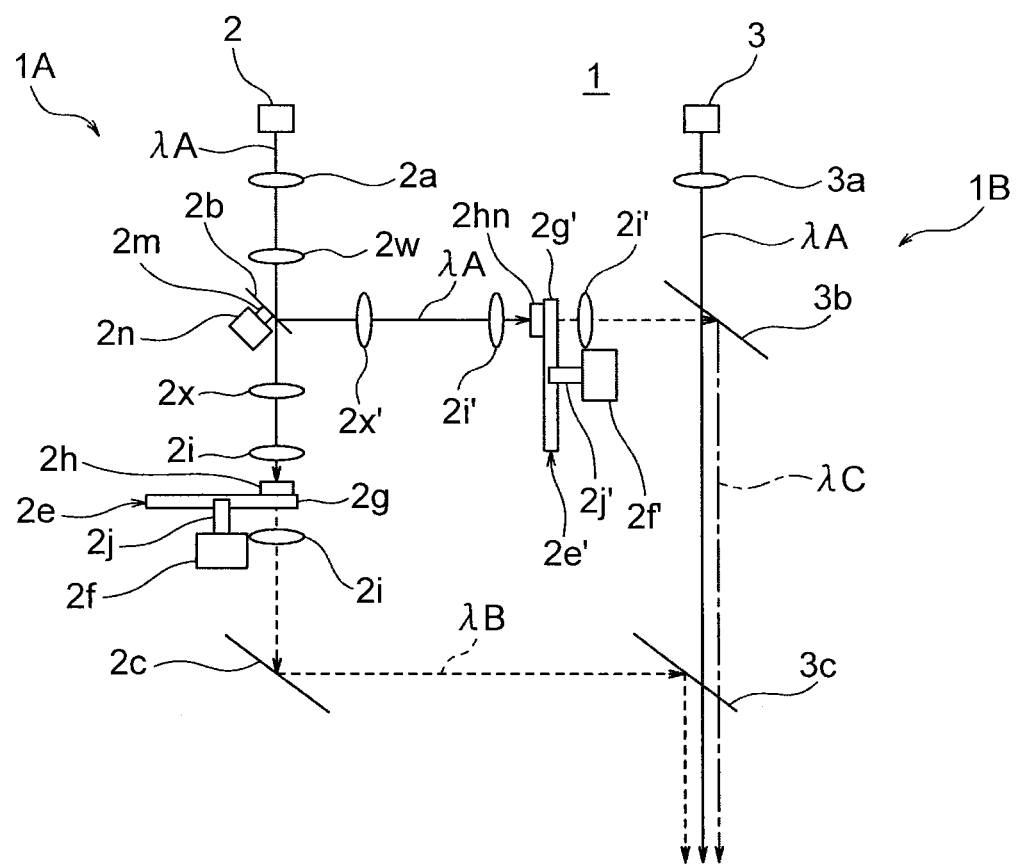
FIG. 17 is an optical view of an illumination light source system according Embodiment 4 of the present invention.
Figure 18:
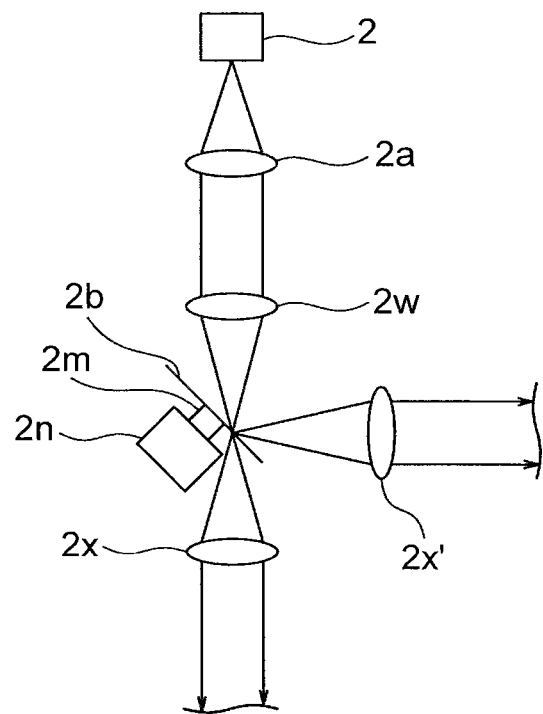
FIG. 18 is a partially enlarged view of a first illumination optical system illustrated in FIG. 17.

In Embodiment 4, a condensing element 2w is provided in the emission light path of the first illumination optical system 1A in Embodiment 3 as illustrated in FIGS. 17, 18, the coupling lens 2x is provided in the transmission light path, and the coupling lens 2x' is provided in the reflection light path.

According to Embodiment 4, the light of wavelength λA emitted from the light source 2 is condensed by the coupling lens 2a, is guided to the condensing element 2w as a parallel light beam, is concentrated by the condensing element 2w, and is guided to the reflection/transmission wheel 2b, as illustrated in FIG. 18.

When the reflection area 2p is located in the emission light path of the first illumination optical system 1A, the concentrated light of wavelength λA is reflected by the reflection area 2p, is guided to the coupling lens 2x', is guided to the condensing element 2i' as a parallel light beam by the coupling lens 2x', and is concentrated by the condensing element 2i', so that the converged light irradiates the phosphor 2hn.

When the transmission area 2q is located in the emission light path of the first illumination optical system 1A, the concentrated light of wavelength λA is transmitted through the transmission area 2q, is guided to the coupling lens 2x', is guided to the condensing element 2i as a parallel light beam by the coupling lens 2x, and is concentrated by the condensing element 2i, so that the concentrated light illuminates the phosphor 2h.

Figure 19:
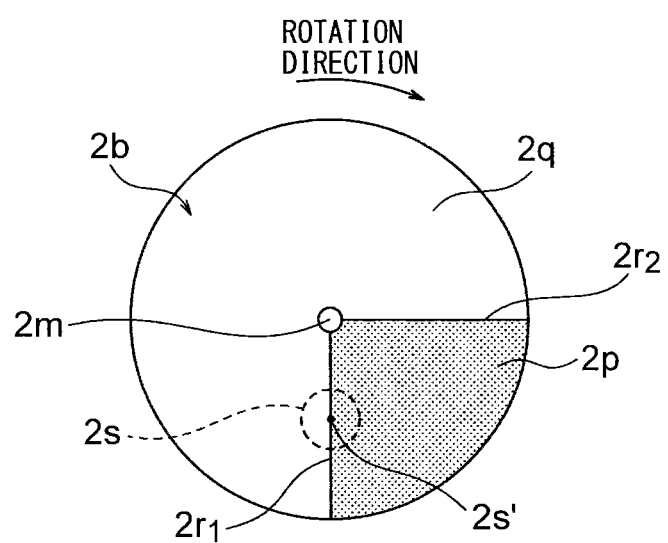
FIG. 19 is a view illustrating a spot area formed in the reflection/transmission wheel by the first illumination optical system illustrated in FIG. 17.

In Embodiment 4, as illustrated in FIG. 19, the light beam of wavelength λA is concentrated, and the concentrated light irradiates the reflection/transmission wheel 2b, so that the size of the spot area 2s' can be reduced compared to the size of the spot area 2s of the first illumination optical system 1A in Embodiment 3.

Therefore, the time that the boundary area line $2r_1$, $2r_2$ between the transmission area 2q and the reflection area 2p of the reflection/transmission wheel 2b crosses the spot area 2s' can be reduced.

Consequently, according to Embodiment 4, the time in which the light source 2 is turned off and the light source 3 is turned on can be reduced in order to prevent color mixing, and the flexibility of the on/off control of the light sources 2, 3 can be improved while the color reproducibility and brightness can be further improved.

The other configurations and operations are the same as those in Embodiment 3; thus, the detailed description thereof will be omitted.

Embodiment 5

Figure 20:
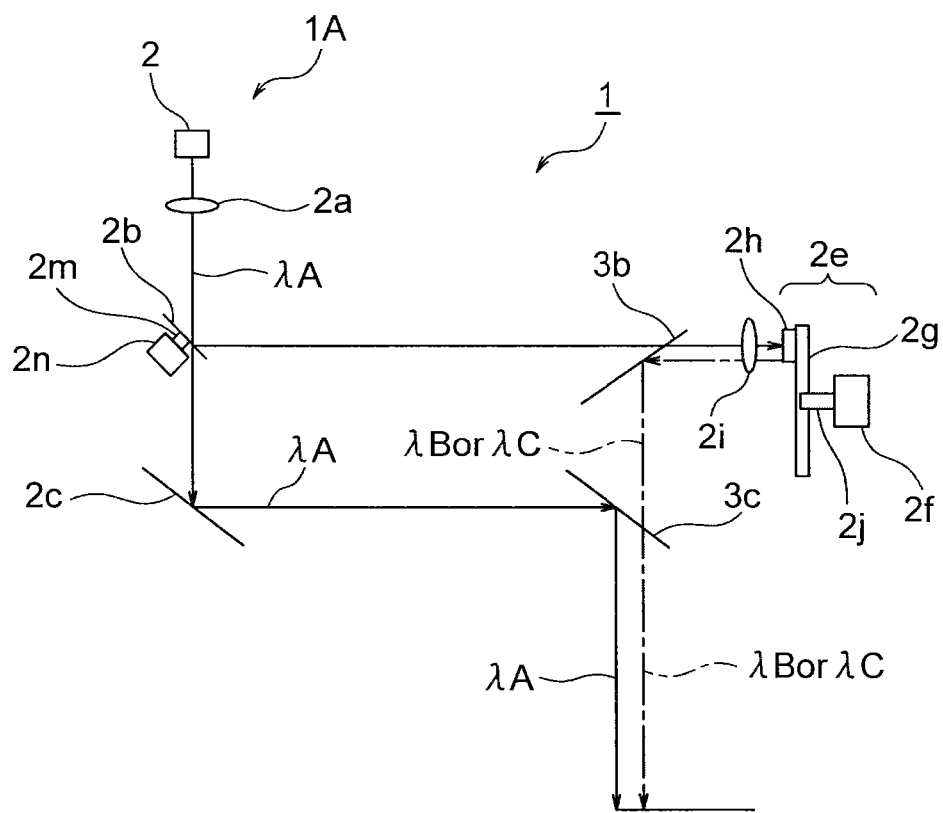
FIG. 20 is an optical view of an illumination light source according to Embodiment 5 of the present invention.

In Embodiment 5, the illumination optical system 1 includes one light source. A light source which emits light of wavelength λA (blue) is used for the light source similar to Embodiment 1. In FIG. 20, reference 2 denotes the light source.

Figure 21:
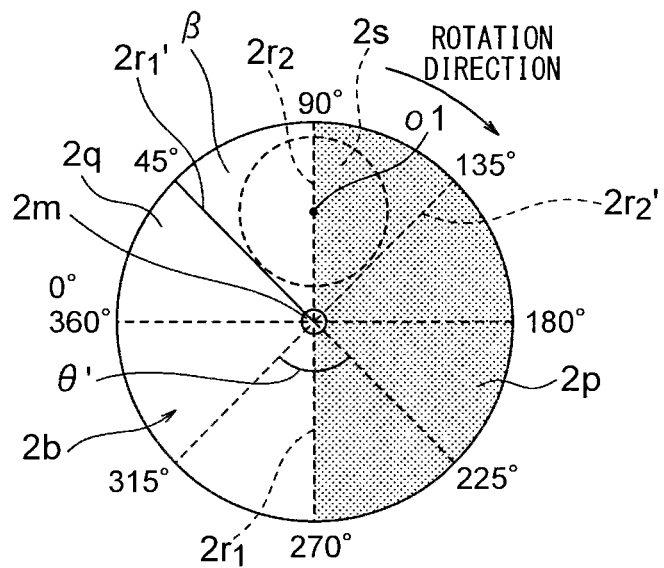
FIG. 21 is a plan view illustrating the reflection/transmission wheel illustrated in FIG. 20.

As illustrated in FIG. 21, the reflection/transmission wheel 2b is formed such that the reflection area 2p and the transmission area 2q are symmetric at 180 degrees with the line passing through the center of the rotation axis 2m as the boundary. The other configurations of the reflection/transmission wheel 2b in Embodiment 5 are the same as those in Embodiment 1, and the configuration of the total reflection mirror 2c in Embodiment 5 is the same as that in Embodiment 1. Therefore, these configurations will be described with the references which are the same as those in FIG. 1.

In order to divide the reflection/transmission wheel 2b into the reflection area 2p and the transmission area 2q, the straight line passing through the center of the rotation axis 2m is divided into two lines by the center of the rotation axis 2m, as illustrated in FIG. 21. One of the two lines is illustrated as the boundary area line $2r_1$ in the radial direction and the other of the two lines is illustrated as the boundary area line $2r_2$ in the radial direction.

Figure 22:
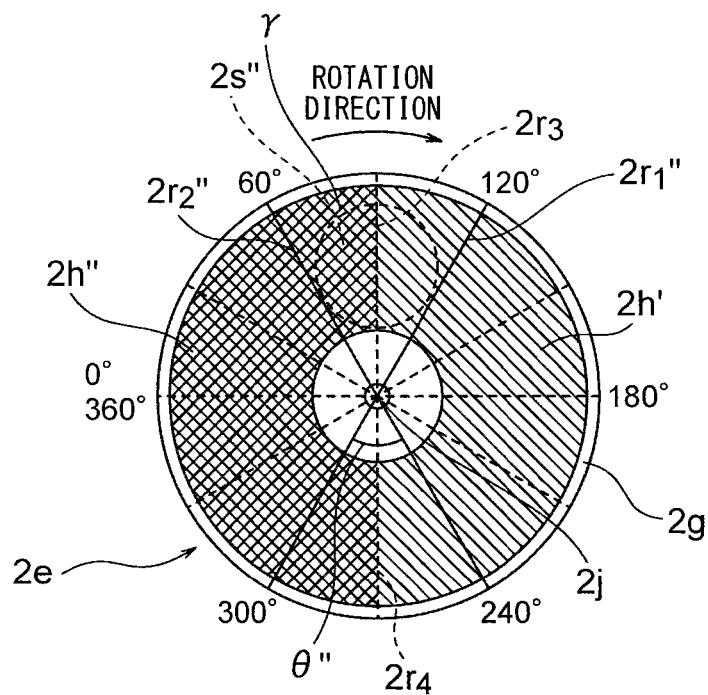
FIG. 22 is a plan view illustrating a fluorescent wheel illustrated in FIG. 20.

As illustrated in FIG. 22, the ring-shaped phosphor 2h of the fluorescent wheel 2e includes a semicircular arc phosphor 2h' which generates fluorescent light of wavelength λB, and a semicircular arc phosphor 2h" which generates fluorescent light of wavelength λC (red) different from the wavelength λB (green). In Embodiment 5, the disc-shaped rotation base 2g is divided at 180 degrees so as to have the semicircular arc phosphors each generating light having a different wavelength. However, it is not limited thereto.

As illustrated in FIG. 22, the straight line passing through the center of the rotation axis 2j of the disc-shaped rotation base 2g, which forms the boundary line between the semicircular arc phosphor 2h' and the semicircular arc phosphor 2h", is divided into two lines by the rotation axis 2j. One of the two lines is illustrated as the boundary area line $2r_3$ in the radius direction and the other of the two lines is illustrated as the boundary area line $2r_4$ in the radius direction as illustrated in FIG. 22.

The dichroic mirror 3b is provided in the reflection light path of the reflection/transmission wheel 2b, and the dichroic mirror 3c is provided in the transmission light path. The dichroic mirror 3b transmits the light of wavelength λA, and reflects the light of wavelength λB and the light of wavelength λC.

The dichroic mirror 3c reflects the light of wavelength λA, and transmits the light of wavelength λB and the light of wavelength λC.

The driver 2f includes a stepping motor, for example. The disc-shaped rotation base 2g rotates about the rotation axis 2j based on predetermined rotation angle positions of the semicircular arc phosphors 2h', 2h".

Upon the turning on of the light source 2, the blue light of wavelength λA irradiates the reflection/transmission wheel 2b.

When the transmission area 2q exists in the emission light path of the illumination light system 1, the blue light of wavelength λA is guided to the transmission area 2q as a parallel light beam through the coupling lens 2a, is transmitted through the transmission area 2q, is reflected by the total reflection mirror 2c, is guided to the dichroic mirror 3c, and is reflected by the dichroic mirror 3c, so that the light is emitted from the illumination optical system 1.

When the reflection area 2p exists in the emission light path of the illumination light system 1, the blue light of wavelength λA is guided to the reflection area 2p as a parallel light beam through the coupling lens 2a, is reflected by the reflection area 2p, passes through the dichroic mirror 3b, is guided to the condensing element 2i, and is concentrated to the fluorescent wheel 2e by the condensing element 2i so as to irradiate the fluorescent wheel 2e.

When the blue light of wavelength λA is concentrated so as to irradiate the semicircular phosphor 2h' of the phosphor 2h, the fluorescent light (green light) of wavelength λB is generated with the blue light as the excitation light. When the blue light of wavelength λA is concentrated so as to irradiate the semicircular arc phosphor 2h", the fluorescent light (red light) of wavelength λC is generated with the blue light as the excitation light.

The fluorescent light of wavelength λB or the fluorescent light of wavelength λC is concentrated by the condensing element 2i, is guided to the dichroic mirror 3b, is reflected by the dichroic mirror 3b, and passes through the dichroic mirror 3c, so that the light is emitted from the illumination optical system 1.

(Example of Irradiation Timing to Image Generator 16)

Figure 23:
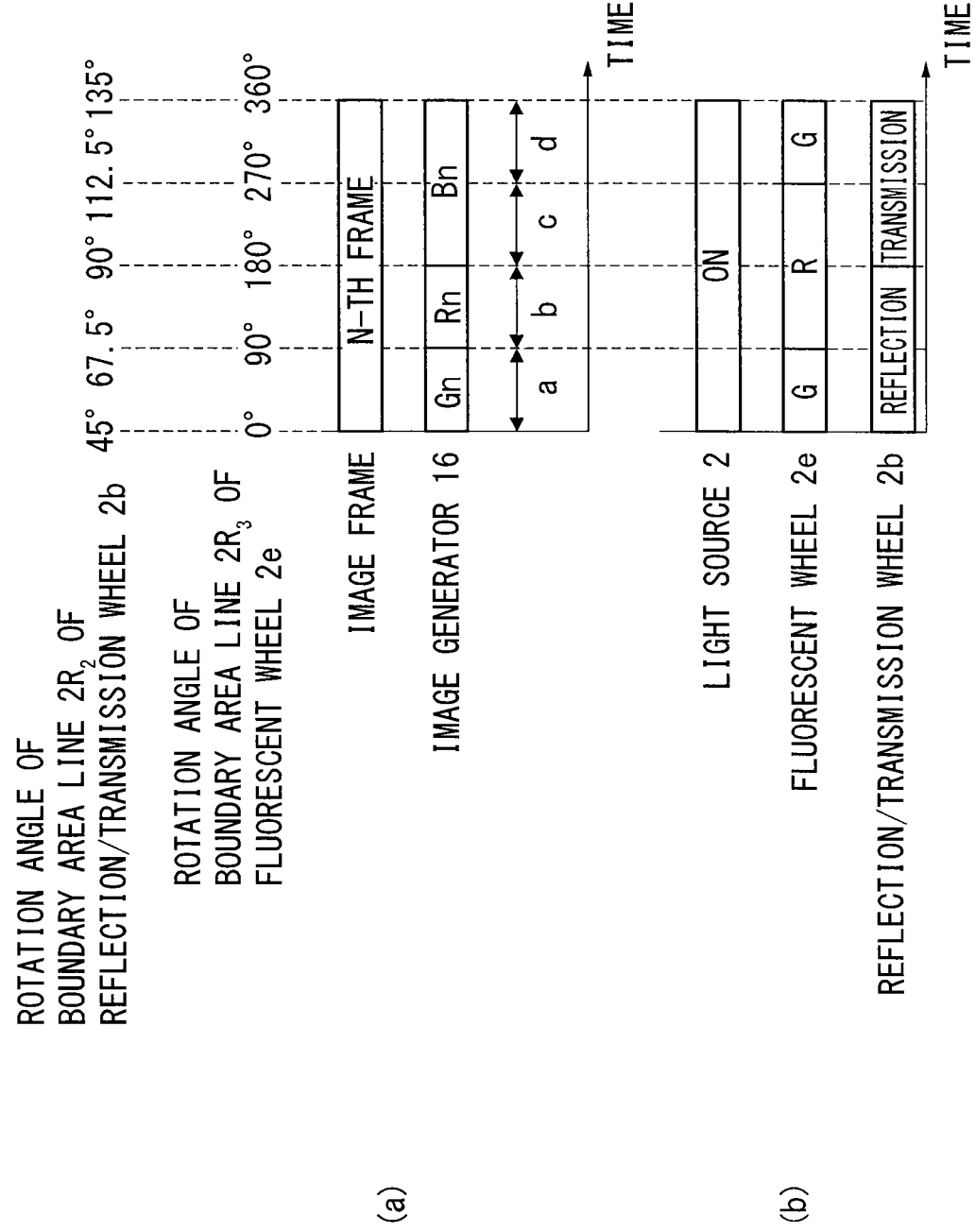
FIG. 23 is a view illustrating one example of a relationship among colors of light irradiating an image generator by using the illumination light source system illustrated in FIG. 20, an on/off timing of each light source, and transmission/reflection of a reflection/transmission wheel relative to an image frame.

FIG. 23 a view illustrating one example of the relationship of the RGB light irradiation timing, the reflection/transmission timing of the reflection/transmission wheel 2b and the fluorescent wheel with respect to the n-th image frame.

One frame period is divided into four periods a, b, c, d in the n-th image frame. During the period a, namely, when the rotation angle position of the boundary area line 2r2 is located in the position at 45-67.5 degrees (the rotation angle position of the boundary area line $2r_3$ of fluorescent wheel 2e is located in the position at 0-90 degrees), the reflection area 2p of the reflection/transmission wheel 2b is located in the emission light path of the first illumination optical system 11 by the controller 11. The rotation angle position of the fluorescent wheel 2e is also controlled by the controller 11 such that the semicircular arc phosphor 2h' of the fluorescent wheel 2e is irradiated with the light of wavelength λA.

The green (Gn) fluorescent light of wavelength λB is thereby generated; the green (Gn) fluorescent light of wavelength λB is emitted from the illumination optical system 1 through the dichroic mirrors 3b, 3c, and irradiates the image generator 16.

During the period b, namely, when the rotation angle position of the boundary area line $2r_2$ is located in the position at 67.5-90 degrees (the rotation angle position of the boundary area line $2r_3$ of the fluorescent wheel 2e is located in the position at 90-180 degrees), the reflection area 2p of the reflection/transmission wheel 2b is located in the light path of the first illumination optical system 1 by the controller 11. The rotation angle position of the fluorescent wheel 2e is also controlled by the controller 11 such that the semicircular arc phosphor 2h" of the fluorescent wheel 2e is irradiated with the light of wavelength λA.

The red (Rn) fluorescent light of wavelength λC is thereby generated; the red (Rn) fluorescent light of wavelength λC is emitted from the illumination optical system 1 through the dichroic mirror 3b, 3c, and irradiates the image generator 16.

During the periods c, d, namely, when the rotation angle position of the boundary area line $2r_2$ is located in the position at 90-135 degrees (the rotation angle position of the boundary area line $2r_3$ of the fluorescent wheel $2e$ is located in the position at 180-360 degrees), the transmission area $2q$ of the reflection/transmission wheel $2b$ is located in the light path of the first illumination optical system $1A$ by the controller $11$. The blue (Bn) light of wavelength $\lambda A$ passes through the transmission region $2q$, is reflected by the total reflection mirror $2c$ and the dichroic mirror $3c$, is emitted from the illumination optical system $1$, and irradiates the image generator $16$.

In Embodiment 5, RGB light irradiates the image generator $16$ within one frame period, so that a full color image can be obtained and also white projection can be performed similar to Embodiments 1, 3, 4. The color tone and the color temperature can be changed similar to Embodiment 3. A projector which is the same as that in Embodiment 2 except for the optical configuration elements of the illumination optical system $1$ can be used in this embodiment; thus, the detailed description thereof will be omitted.

According to Embodiment 5, the illumination optical system $1$ includes only one light source, so that the number of optical elements of the illumination optical system $1$ can be reduced, and also the size and the costs of the illumination optical system $1$ can be reduced.

(Control Example for Preventing Color Mixing)

Figure 25A:
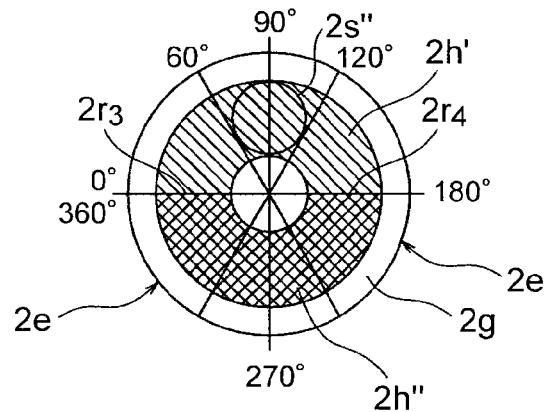
FIG. 25A is a view describing a rotation angle position of the fluorescent wheel illustrated in FIG. 22 and illustrating one boundary area in a standard position at 0 degree.
Figure 25B:
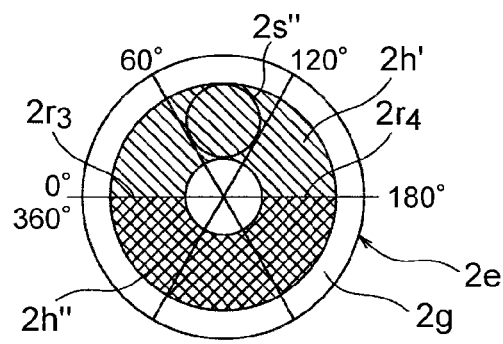
FIG. 25B is a view describing a rotation angle position of the fluorescent wheel illustrated in FIG. 22 and illustrating one boundary area in a position at 0 degree.
Figure 25C:
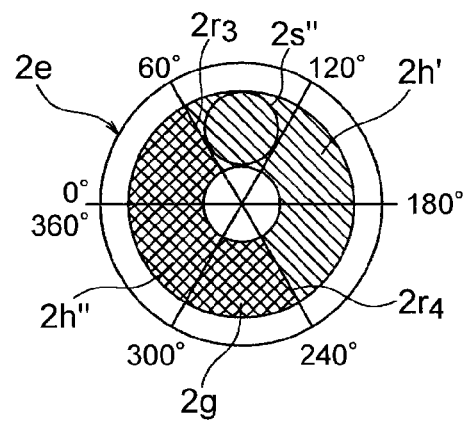
FIG. 25C is a view describing a rotation angle position of the fluorescent wheel illustrated in FIG. 22 and illustrating one boundary area in a position at 60 degrees.
Figure 25D:
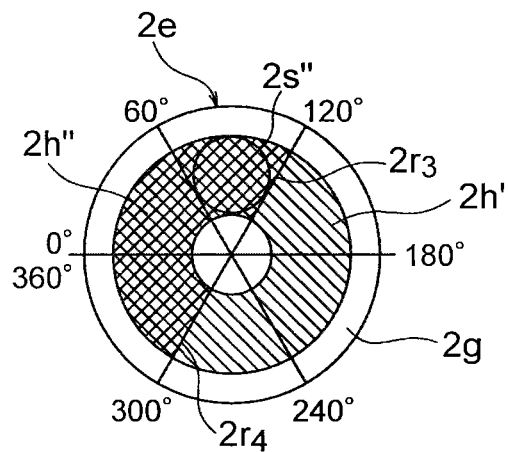
FIG. 25D is a view describing a rotation angle position of the fluorescent wheel illustrated in FIG. 22 and illustrating one boundary area in a position at 120 degrees.
Figure 25E:
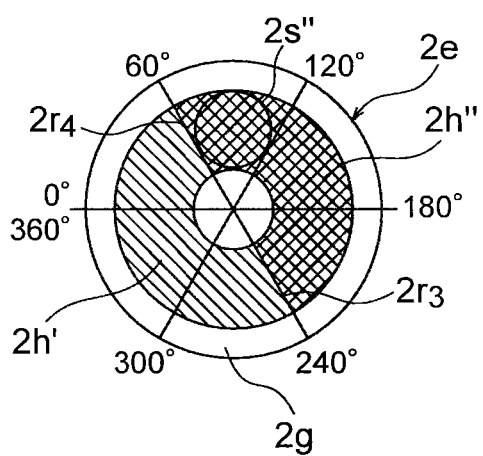
FIG. 25E is a view describing a rotation angle position of the fluorescent wheel illustrated in FIG. 22 and illustrating one boundary area in a position at 240 degrees.
Figure 25F:
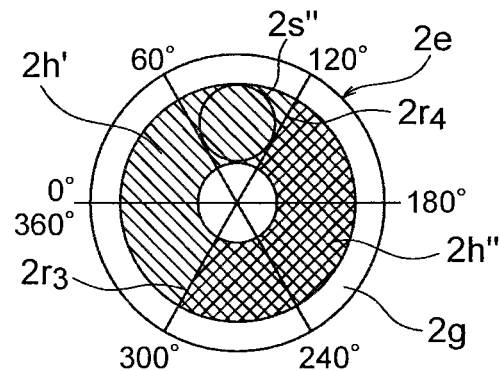
FIG. 25F is a view describing a rotation angle position of the fluorescent wheel illustrated in FIG. 22 and illustrating one boundary area in a position at 300 degrees.
Figure 25G:
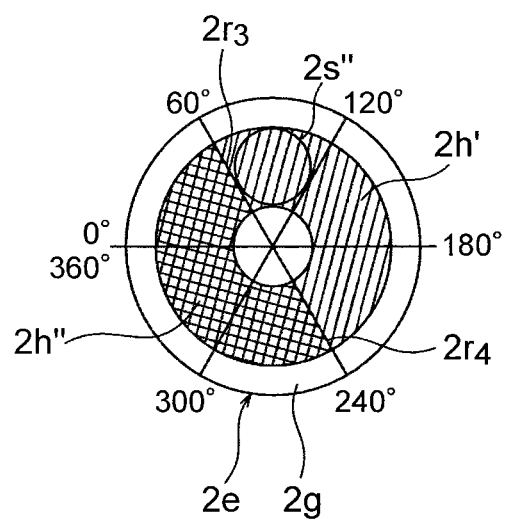
FIG. 25G is a view describing a rotation angle position of the fluorescent wheel illustrated in FIG. 22 and illustrating one boundary area in a position at 60 degrees.
Figure 26:
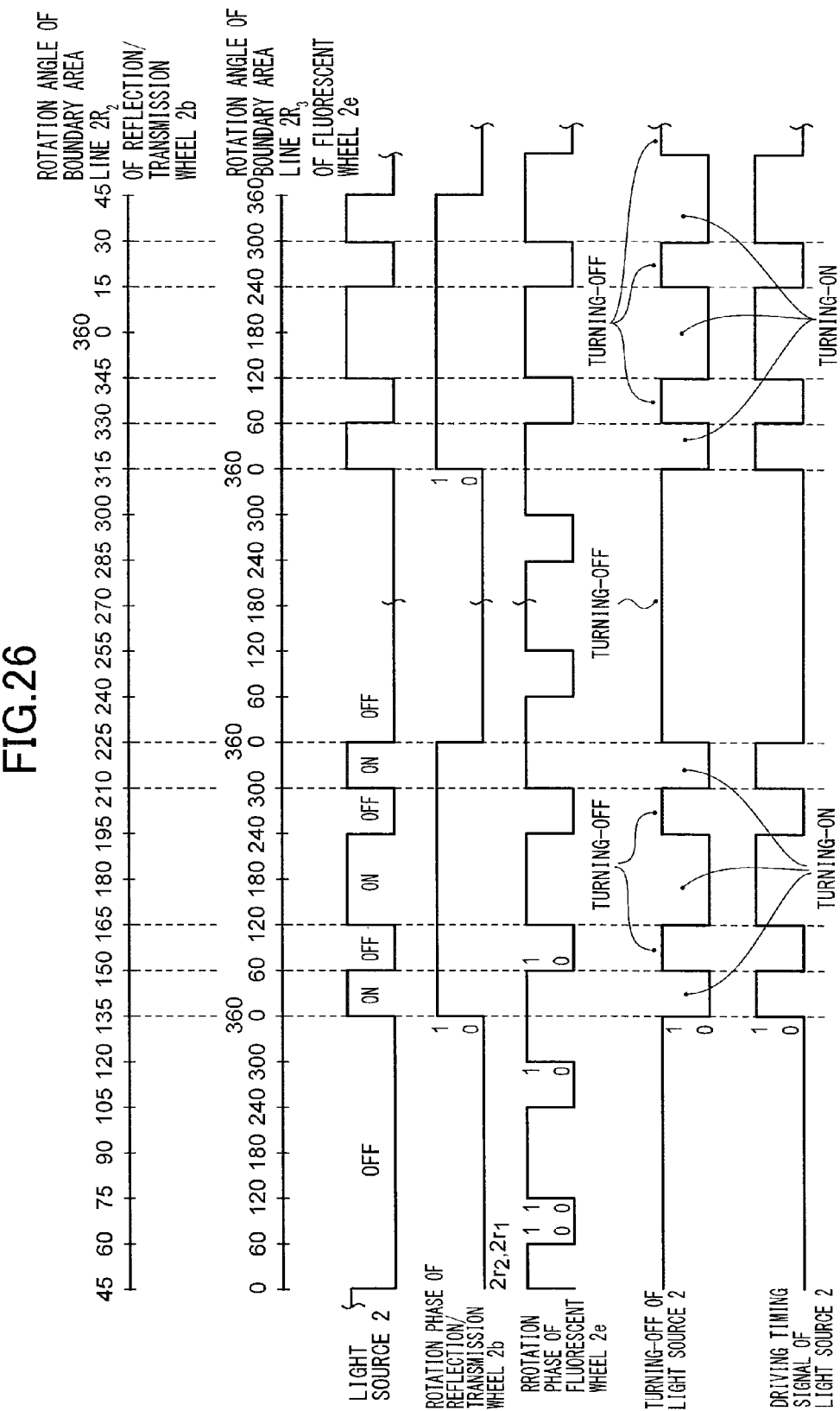
FIG. 26 is a timing chart illustrating a relationship between an on/off timing of each light source and a rotation angle position of each wheel when the reflection/transmission wheel illustrated in FIG. 21 and the fluorescent wheel illustrated in FIG. 22 are used.

FIGS. 24A-24G are views each illustrating a relationship between the spot area $2s$ and the rotation angle position of the reflection/transmission wheel $2b$. FIGS. 25A-25G are views each illustrating a relationship between the spot area $2s''$ and the rotation angle position of the fluorescent wheel $2e$. FIG. 26 is a timing chart illustrating a turning-on control relationship between the light source $2$ and the rotation angle position of each wheel.

In Embodiment 1, when the boundary area line $2r_1$, $2r_2$ crosses the spot area $2s$, the light source $2$ is controlled to be turned on/off. However, in this embodiment, when the boundary area line $2r_2$ crosses the spot region $2s$, the light source $2$ is controlled to be turned on.

As illustrated in FIG. 21, when the boundary area line $2r_2$ of the reflection/transmission wheel $2b$ crosses the spot area $2s$, half of the light of wavelength $\lambda A$ from the light source $2$ is transmitted through the transmission area $2q$, and the remaining half of the light is reflected by the reflection area $2p$. The reflected light is guided to the reflection light path, and is guided to the fluorescent wheel $2e$.

When the boundary area line $2r_3$ of the fluorescent wheel $2e$ crosses the spot area $2s''$, the semicircular phosphor $2h'$ is excited with the light of wavelength $\lambda A$ from the light source $2$ as the excitation light so as to generate the fluorescent light of wavelength $\lambda B$ while the semicircular phosphor $2h''$ is excited so as to generate the fluorescent light of wavelength $\lambda C$ as illustrated in FIG. 22. The fluorescent light of wavelength $\lambda B$ and the fluorescent light of wavelength $\lambda C$ are emitted from the illumination light source $1$ through the condensing element $2i$ and the dichroic mirrors $3b$, $3c$, resulting in the color mixing.

Therefore, the controller $11$ controls the turning-on of the light source $2$ based on the rotation angle position of the reflection/transmission wheel $2b$ and the rotation angle position of the fluorescent wheel $2e$. In this embodiment, a sensor for detecting the rotation angle position of the fluorescent wheel $2e$ is provided.

As described above, an angle $\theta'$ formed by the two tangential lines $2r_{1'}$, $2r_{2'}$ which extend in the radial direction from the center of the rotation axis $2m$ and have contact with the circle of the spot area $2s$ is determined based on the radius of the circle of the spot area $2s$ and the distance from the center of the rotation axis $2m$ to the center (optical axis $01$) of the spot area $2s$.

In this case, the angle $\theta'$ is, for example, 90 degrees. When the light (blue) of wavelength $\lambda A$ exits in the fan-shape area $\beta$ surrounded by the two tangential lines $2r_{1'}$, $2r_{2'}$, and the light source $2$ is turned on, the light (blue) of wavelength $\lambda A$ is transmitted through the transmission area $2q$ and is reflected by the reflection area $2p$.

Color mixing occurs when the boundary area line $2r_3$, $2r_4$ of the fluorescent wheel $2e$ crosses the spot area $2s''$. An angle $\theta''$ formed by the two tangential lines $2r_{1''}$, $2r_{2''}$ which extend from the center of the rotation axis $2j$ in the radial direction and have contact with the circle of the spot area $2s''$ is determined based on the radius of the circle of the spot area $2s''$ and the distance from the center of the rotation axis $2j$ to the center of the spot area $2s''$.

In this case, the fluorescent wheel $2e$ rotates at a rotation speed four times faster than that of the reflection/transmission wheel $2b$, and the angle $\theta''$ is, for example, 60 degrees. In addition, the angles $\theta'$, $\theta''$ are specified for simplifying the description. However, they are not limited thereto.

Figure 24A:
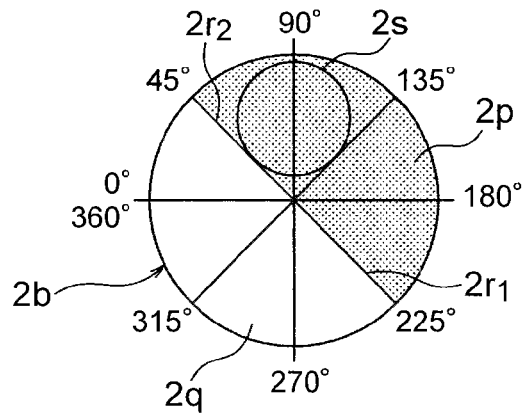
FIG. 24A is a view describing a rotation angle position of the reflection/transmission wheel illustrated in FIG. 21 and illustrating one boundary area in a standard position at 45 degrees.
Figure 24B:
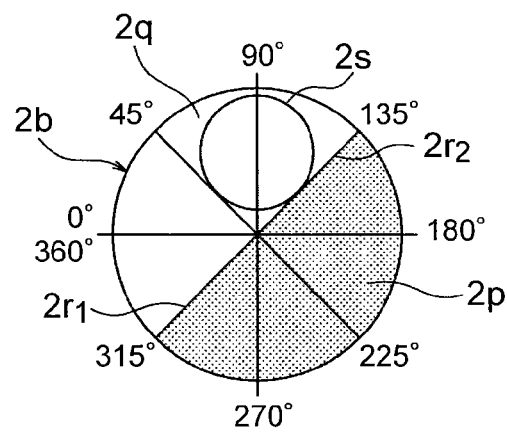
FIG. 24B is a view describing a rotation angle position of the reflection/transmission wheel illustrated in FIG. 21 and illustrating one boundary area in a position at 135 degrees.
Figure 24C:
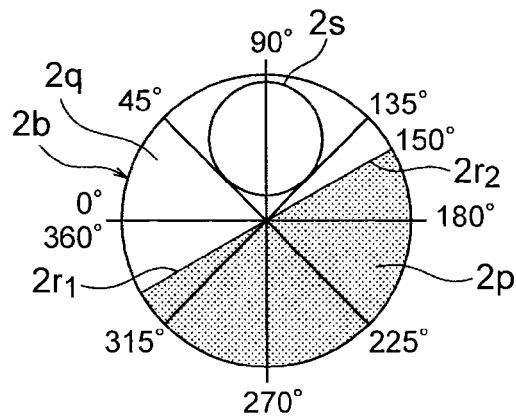
FIG. 24C is a view describing a rotation angle position of the reflection/transmission wheel illustrated in FIG. 21 and illustrating one boundary area in a position at 150 degrees.
Figure 24D:
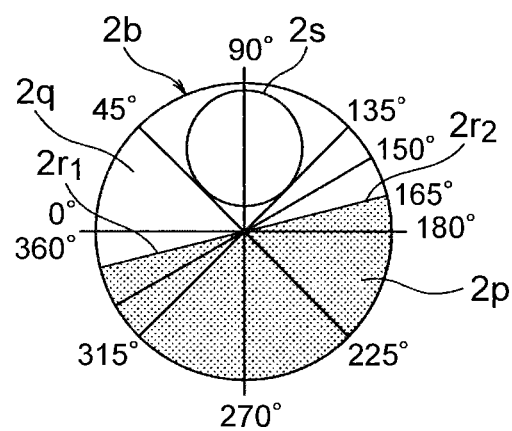
FIG. 24D is a view describing a rotation angle position of the reflection/transmission wheel illustrated in FIG. 21 and illustrating one boundary area in a position at 165 degrees.
Figure 24E:
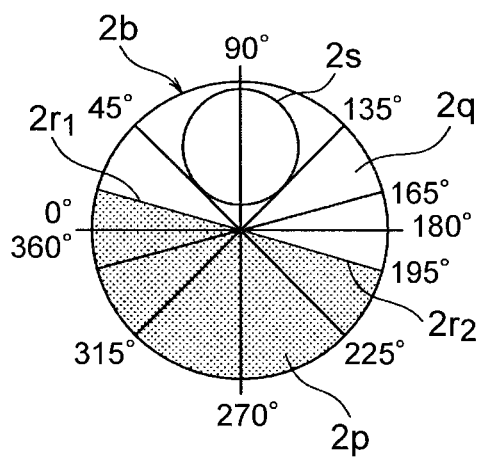
FIG. 24E is a view describing a rotation angle position of the reflection/transmission wheel illustrated in FIG. 21 and illustrating one boundary area in a position at 195 degrees.
Figure 24F:
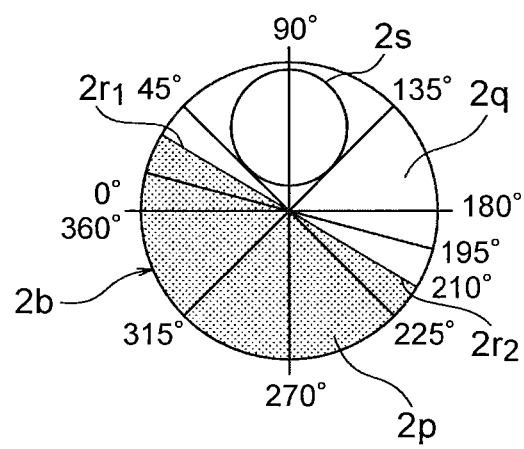
FIG. 24F is a view describing a rotation angle position of the reflection/transmission wheel illustrated in FIG. 21 and illustrating one boundary area in a position at 210 degrees.
Figure 24G:
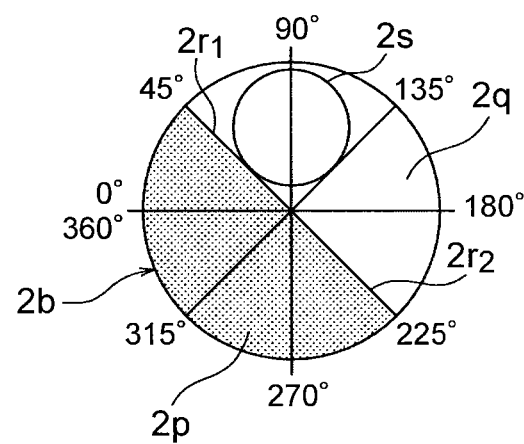
FIG. 24G is a view describing a rotation angle position of the reflection/transmission wheel illustrated in FIG. 21 and illustrating one boundary area in a position at 225 degrees.

The reflection/transmission wheel $2b$ starts rotating when the boundary area line $2r_2$ is inclined at 45 degrees to the reference position at 0 degrees as illustrated in FIG. 24A. The fluorescent wheel $2e$ starts rotating when the boundary area line $2r_3$ is located in the reference position at 0 degrees as illustrated in FIG. 25A.

FIG. 26 illustrates a relationship of the rotation angle (rotation phase) of the boundary area line $2r_2$, $2r_1$ of the reflection/transmission wheel $2b$, the rotation angle (rotation phase) of the boundary area line $2r_3$, $2r_4$ of the fluorescent wheel $2e$, the on/off timing of the light source $2$, the turning-off timing signal of the light source $2$, and the driving timing of the light source $2$.

FIG. 26 illustrates the rotation angles of four-rotation of the fluorescent wheel $2e$ relative to the rotation angles of one-rotation of the reflection/transmission wheel $2b$.

The rotation angle positions of the reflection/transmission wheel $2b$ are illustrated with a 15-degree scale, whereas the rotation angle positions of the fluorescent wheel $2e$ are illustrated with a 60-degree scale.

The rotation phase of the reflection/transmission wheel $2b$ is set to "0" when the boundary area line $2r_2$ or the boundary area line $2r_1$ crosses the spot area $2s$. The rotation phase of the reflection/transmission wheel $2e$ is set to "1" when the boundary area line $2r_2$ or the boundary area line $2r_1$ does not cross the spot area $2s$. The rotation phase of the fluorescent wheel $2e$ is set to "0" when the boundary area line $2r_3$ or the boundary area line $2r_4$ crosses the spot area $2s''$.

The turning-off timing signal of the light source $2$ is set to "1" in the turning-off, and is set to "0" in the releasing of the turning-off (turning-on). The driving timing signal of the light source $2$ is set to "1" in the turning-on, and is set to "0" in the releasing of the turning-on (turning-off).

Hereinafter, the relationship between the rotation phase of the fluorescent wheel $2e$ and the reflection/transmission wheel $2b$ and the tuning-on/off of the light source $2$ will be described in detail with reference to FIGS. 24A-24G, 25A-25G, and 26.

(Description of Rotation Phase of Reflection/Transmission Wheel $2b$)

While the boundary area line $2r_2$ of the reflection/transmission wheel $2b$ exists in the range from 45-135 degrees (refer to FIGS. 24A, 24B), the boundary area line $2r_2$ crosses the spot area $2s$, so that the rotation phase of the reflection/ transmission wheel 2b is "0". While the boundary area line 2$r_2$ of the reflection/transmission wheel 2b exists in the range from 135-225 degrees (refer to FIGS. 24A, 24B), both of the boundary area lines 2$r_2$, 2$r_1$ of the reflection/transmission wheel 2b do not cross the spot area 2s, so that the rotation phase of the reflection/transmission wheel 2b is "1".

While the boundary area line 2$r_2$ of the reflection/transmission wheel 2b exists in the not-shown range from 225-315 degrees, namely, while the boundary area line 2$r_1$ exists in the range from 45-135 degrees, the boundary area line 2$r_2$ crosses the spot area 2s, so that the rotation phase of the reflection/transmission wheel 2b is "0".

While the boundary area line 2$r_2$ of the reflection/transmission wheel 2b exists in the not-shown range from 315-45 degrees, namely, while the boundary area line 2$r_1$ exists in the range from 135-225 degrees, both of the boundary area lines 2$r_2$, 2$r_1$ do not cross the spot area 2s, so that the rotation phase of the reflection/transmission wheel 2b is "1".

While the boundary area line 2$r_3$ of the fluorescent wheel 2e exists in the range from 0-60 degrees (refer to FIGS. 25B, 25C), both of the boundary area lines 2$r_2$, 2$r_1$ do not cross the spot area 2s", so that the rotation phase of the fluorescent wheel 2e is "1".

While the boundary area line 2$r_3$ of the fluorescent wheel 2e exists in the range from 60-120 degrees (refer to FIGS. 25C, 25D), the boundary area line 2$r_3$ crosses the spot area 2s", so that the rotation phase of the fluorescent wheel 2e is "0".

While the boundary area line 2$r_3$ of the fluorescent wheel 2e exists in the range from 120-240 degrees (refer to FIGS. 25D, 25E), both of the boundary area lines 2$r_3$, 2$r_4$ do not cross the spot area 2s", so that the rotation phase of the fluorescent wheel 2e is "1".

While the boundary area line 2$r_3$ of the fluorescent wheel 2e exists in the range from 240-300 degrees (refer to FIGS. 25E, 25F), the boundary area line 2$r_4$ crosses the spot area 2s", so that the rotation phase of the fluorescent wheel 2e is "0".

While the boundary area line 2$r_3$ of the fluorescent wheel 2e exists in the range from 300-60 degrees (refer to FIGS. 25F. 25G), both of the boundary area lines 2$r_4$, 2$r_3$ do not cross the spot area 2s", so that the rotation phase of the fluorescent wheel 2e is "1".

Accordingly, the rotation phase relationship of the fluorescent wheel 2e to the reflection/transmission wheel 2b during one rotation of the reflection/transmission wheel is as illustrated in FIG. 26.

(Control for Preventing Color Mixing)

Color mixing occurs due to the turning-on of the light source 2 while the reflection/transmission wheel 2b crosses the spot area 2s. The controller 11 therefore sets the turning-off timing signal of the light source 2 to "1" and sets the driving timing signal of the light source 2 to "0" when the rotation phase of the reflection/transmission wheel 2b is "0", namely, during the rotation angle from 45-135 degrees and the rotation angle from 225-315 degrees regardless of the rotation phase of the fluorescent wheel 2e.

Color mixing also occurs due to the turning-on of the light source 2 while the boundary area line 2$r_3$, 2$r_4$ of the fluorescent wheel 2e crosses the spot area 2" even when the reflection/transmission wheel 2b does not cross the spot area 2s. The controller 11 therefore sets the turning-off timing signal of the light source 2 to "1" and the driving timing signal of the light source 2 to "0" when the rotation phase of the reflection/transmission wheel 2b is "1" and the rotation phase of the fluorescent wheel 2e is "0", namely, when the rotation angle of the reflection/transmission wheel 2b is in the range of 150-165 degrees and the rotation angle of the reflection/transmission wheel 2b is in the range of 195-210 degrees within the range of 135-225 degrees.

On the other hand, the controller 11 sets the turning-off timing signal of the light source 2 to "0" and sets the driving timing signal of the light source 2 to "1" when the rotation phase of the reflection/transmission wheel 2b is "1" and the rotation phase of the fluorescent wheel 2e is "1", namely, when the rotation angle of the reflection/transmission wheel 2b is in the range of 135-150 degrees, 165-195 degrees, and 210-225 degrees within the range of 135-225 degrees.

Moreover, the controller 11 sets the turning-off timing signal of the light source 2 to "1" and sets the driving timing signal of the light source 2 to "0" when the rotation angle of the reflection/transmission wheel 2b is in the range of 330-345 degrees and 15-30 degrees within the range of 315-45 degrees.

Moreover, the controller 11 sets the turning-off timing signal of the light source 2 to "0" and sets the driving timing signal of the light source 2 to "1" when the rotation angle of the reflection/transmission wheel 2b is in the range of 315-330 degrees, 345-15 degrees, and 30-45 within the range of 315-45 degrees.

Upon the control with the controller 11, the light source 2 is turned off in the range of the reflection/transmission wheel 2b at 45-135 degrees, is turned on in the range of 135-150 degrees, is turned off in the range of 150-165, is turned on in the rage of 165-195 degrees, is turned off in the range of 195-210, is turned on in the range of 210-225 degrees, is turned off in the range of 225-315 degrees, is turned on in the range of 315-330 degrees, is turned off in the range of 330-345, is turned on in the range of 345-15 degrees, is turned off in the range of 15-30 degrees, and is turned on in the range of 30-45 degrees. Accordingly, the occurrence of color mixing due to four-rotation of the fluorescent wheel 2e during one rotation of the reflection/transmission wheel 2b is prevented.

In this embodiment, the light source 2 is turned off when both of the boundary area lines 2$r_1$, 2$r_2$ of the fluorescent wheel 2b pass through the spot area 2s. However, the light source 2 can be turned off only when one of the boundary area lines 2$r_1$, 2$r_2$ crosses the spot area 2s.

In this embodiment, the fluorescent wheel 2e rotates at a rotation speed four times faster than that of the reflection/transmission wheel 2b. However, it is not limited thereto. Namely, the configuration is not limited to this embodiment as long as the light source 2 is turned off when the boundary in the reflection/transmission wheel 2b crosses the spot area 2s, and the light source 2 is turned off when the fluorescent wheel 2e crosses the spot area 2s" even when the boundary in the reflection/transmission wheel 2b does not cross the spot area 2s.

Although the embodiments of the present invention have been described above, the present invention is not limited thereto. It should be appreciated that variations may be made in the embodiments and the aspects described by persons skilled in the art without departing from the scope of the present invention.

According to the embodiments of the present invention, the excitation light is guided to the phosphor by using at least one of the reflection area and the transmission area in the reflection/transmission member while the excitation light source is turned on, so as to excite the phosphor. With this configuration, the time in which the phosphor is irradiated with the excitation light per unit time can be reduced, and thus, the phosphor can be prevented from being deteriorated.

Moreover, the light volume of the excitation light is reduced while the boundary area between the transmission area and the reflection area in the reflection/transmission member crosses the emission light path. With this configuration, the occurrence of color mixing can be prevented, and the color reproducibility can be improved.

What is claimed is:

1. An illumination light source system, comprising:
    an excitation light source;
    a reflection/transmission member having a transmission area which transmits excitation light from the excitation light source and a reflection area which reflects the excitation light, the transmission area and the reflection area sequentially crossing an emission light path of the excitation light source;
    a fluorescent member provided in at least one of a reflection light path of the excitation light reflected by the reflection area and a transmission light path of the excitation light transmitted through the transmission area, the fluorescent member being provided with a phosphor which generates a color different from that of the excitation light by excitation with the excitation light; and
    a controller which reduces a light volume of the excitation light source while a boundary area between the transmission area and the reflection area of the reflection/transmission member is located on the emission light path.

2. The illumination light source system according to claim 1, further comprising:
    a boundary area detector which detects a boundary area between the reflection area and the transmission area of the reflection/transmission member;
    a first driver which drives the reflection/transmission member such that the transmission area and the reflection area periodically cross the emission light path of the excitation light source; and
    a second driver which drives the fluorescent member.

3. The illumination light source system according to claim 2 further comprising:
    a light path-combining optical element which forms a combined light path of the transmission light path and the reflection light path, and combines a light beam through the transmission light path and a light beam through the reflection light path so as to emit the combined light beams from an illumination optical system.

4. The illumination light source system according to claim 3, wherein the illumination optical system includes an illumination light source which irradiates the combined light path with illumination light of a color different from that of the excitation light and that of the fluorescent light.

5. The illumination light source system according to claim 4, wherein
    the reflection/transmission member includes a reflection/transmission wheel,
    the fluorescent member includes a fluorescent wheel,
    the first driver includes a rotation driver which rotates the reflection/transmission wheel,
    the second driver includes a rotation driver which rotates the fluorescent wheel, and
    the illumination optical system includes a first illumination optical system having at least the excitation light source, the reflection/transmission wheel, the light path-combining optical element and the fluorescent wheel and a second illumination optical system having the illumination light source.

6. The illumination light source system according to claim 5, wherein the controller controls the illumination light source to be turned on during turning-off control of the excitation light source.

7. The illumination light source system according to claim 5, wherein the first illumination optical system includes a condensing element which concentrates the excitation light from the excitation light source so as to irradiate the reflection/transmission wheel.

8. The illumination light source system according to claim 5, wherein
    the fluorescent wheel includes a disc-shaped base having a reflection member,
    the phosphor has a ring shape, and is formed on the disc-shaped base in a ring shape, and
    the fluorescent light generated by the excitation light source is reflected by the disc-shaped base, and is guided to the light path-combining optical element.

9. The illumination light source system according to claim 3, wherein
    the reflection/transmission member includes a reflection/transmission wheel,
    the fluorescent member includes a fluorescent wheel,
    the first driver includes a rotation driver which rotates the reflection/transmission wheel;
    the second driver includes a rotation driver which rotates the fluorescent wheel;
    the illumination optical system includes a first illumination optical system having at least the excitation light source, the reflection/transmission wheel, the light path-combining optical element and the fluorescent wheel and a second illumination optical system having an illumination light source which generates illumination light of a color which is the same as that of the excitation light from the excitation light source,
    the fluorescent wheel includes a first fluorescent wheel provided in the reflection light path and a second fluorescent wheel provided in the transmission light path,
    the first fluorescent wheel and the second fluorescent wheel include a disc-shaped base having a transmission member,
    a phosphor which generates fluorescent light of a color different from that of the excitation light is formed on the disc-shaped base of the first fluorescent wheel, and the phosphor has a ring shape, and
    a phosphor which generates fluorescent light of a color different from that of the fluorescent light generated by the first fluorescent wheel and that of the excitation light is formed on the disc-shaped base of the second fluorescent wheel, and the phosphor has a ring shape.

10. The illumination light source system according to claim 9, wherein the controller controls the illumination light source to be turned on during the turning-off control of the excitation light source.

11. The illumination light source system according to claim 9, wherein the first illumination optical system includes a condensing element which concentrates the excitation light from the excitation light source so as to irradiate the reflection/transmission wheel.

12. The illumination light source system according to claim 5, wherein the boundary area detector includes a rotation angle detector which detects a rotation angle of the reflection/transmission wheel, and the controller controls the excitation light source to be turned off upon the detection of a timing in which the boundary area of the reflection/transmission wheel crosses the emission light path by using a detection signal of the rotation angle detector.

13. The illumination light source system according to claim 3, wherein
    the reflection/transmission member includes a reflection/transmission wheel which splits the emission light path into the transmission light path and the reflection light path,
    the fluorescent member includes a fluorescent wheel, the first driver includes a rotation driver which rotates the reflection/transmission wheel, the second driver includes a rotation driver which rotates the fluorescent wheel, the fluorescent wheel is provided in one of the transmission light path and the reflection light path, the phosphor is formed on the fluorescent wheel, and the phosphor has a ring shape, and the phosphor is divided into at least two arc-like phosphors by a straight line passing through a rotation center relative to a rotation direction of the fluorescent wheel, and each of the arc-like phosphors generates fluorescent light of a color different from each other by the excitation light.

14. The illumination light source system according to claim 13, wherein the fluorescent wheel includes a disc-shaped base having a reflection member, the phosphor is formed on the disc-shaped base, and fluorescent light generated by the excitation light source is reflected by the disc-shaped base, and is guided to the light path-combining optical element.

15. The illumination light source system according to claim 13, wherein the illumination optical system includes a condensing element which concentrates the excitation light from the excitation light source to irradiate the reflection/transmission wheel.

16. The illumination light source system according to claim 13, wherein the boundary area detector is a rotation angle detector which detects the rotation angle of the reflection/transmission wheel, a rotation angle of the reflection/transmission wheel and a rotation angle of the fluorescent wheel have a certain relationship, and the controller detects a timing in which the boundary area of the reflection/transmission wheel crosses the emission light path by using a detection signal of the rotation angle detector, and detects a timing in which the fluorescent wheel crosses the transmission light path or the reflection light path so as to control the excitation light source to be turned off.

17. The illumination light source system according to claim 12, wherein the rotation angle detector includes an encoder, an acceleration sensor or a potentiometer.

18. A projector, comprising:

the illumination light source system according to claim 1;

an irradiation optical system which guides illumination light emitted from a light path-combining optical element of the illumination light source system to an image generator; and a projection optical system which projects a projection image generated by the image generator, wherein the controller divides a period of one frame of projection image data so as to turn on/off the excitation light source in accordance with the projection image data, and generates a projection image corresponding to the image data by controlling the image generator with a residual image phenomenon of the eyes.

19. The projector according to claim 18, wherein light of a color with the mixture of a color of light of the excitation light source and a color of light of an illumination light source is generated based on a principle of an additive color process by simultaneously turning on the excitation light source and the illumination light source during the one frame period of the image data.

20. A projector, comprising:

the illumination light source system according to claim 9;

an irradiation optical system which guides illumination light emitted from a light path-combining optical element of the illumination light source system to an image generator; and a projection optical system which projects a projection image generated by the image generator, wherein the controller divides a period of one frame of projection image data so as to turn on/off the excitation light source in accordance with the projection image data, and generates a projection image corresponding to the image data by controlling the image generator with a residual image phenomenon of the eyes.

21. The projector according to claim 20, wherein light of a color with the mixture of a color of light of the excitation light source and a color of light of the illumination light source is generated based on a principle of an additive color process by simultaneously turning on the excitation light source and the illumination light source during the one frame period of the image data.

22. A method of controlling an illumination light source system comprising an excitation light source as a part of an illumination optical system, which generates excitation light as visible light; a reflection/transmission member as a part of the illumination optical system, which is provided in an emission light path of the excitation light source and includes a transmission area transmitted through the excitation light from the excitation light source and a reflection area which reflects the excitation light from the excitation light source; a fluorescent member as a part of the illumination optical system, which is provided with at least one of the reflection light path of the excitation light reflected by the reflection area and the transmission light path of the excitation light which passes through the transmission area, so as to generate fluorescent light of a color different from that of the excitation light by the excitation of the excitation light; a boundary area detector which detects a boundary area between the reflection area and the transmission area of the reflection/transmission member; a first driver which drives the reflection/transmission member such that the transmission area and the reflection area periodically cross the emission light path of the excitation light source; a second driver which drives the fluorescent member; a controller which controls the driving of the first driver and the second driver, and controls the excitation light source to be turned off while the boundary area between the transmission area and the reflection area of the reflection/transmission area crosses the emission light path by using the detection result of the boundary area detector; and a light path-combining optical element which forms a combined light path of the transmission light path and the reflection light path, and combines a light beam guided to the light path-combining optical element through the transmission light path and a light beam guided to the light path-combining optical element through the reflection light path so as to emit the combine light beams from an illumination optical system, the method comprising:

a detecting step of detecting a boundary position of the reflection/transmission member; and a control step of turning off the excitation light source when the boundary area of the reflection area and the transmission area crosses the emission light path after calculating a timing in which the reflection/transmission member crosses the emission light path by using the detection result detected by the detecting step.

* * * * *